United States Patent [19]

Ohashi et al.

[11] Patent Number: 5,826,207
[45] Date of Patent: Oct. 20, 1998

[54] DEVICE FOR ESTIMATING AIR PRESSURE OF TIRE FROM VIBRATION COMPONENTS OF VEHICLE WHEEL SPEED

[75] Inventors: Hideki Ohashi; Hiroyuki Kawai, both of Susono; Hiroyoshi Kojima, Nishio; Katsuhiro Asano, Toyoake; Takaji Umeno, Aichi-gun; Toshiharu Naito, Okazaki; Nobuyoshi Onogi, Nagoya; Yuuichi Inoue, Tokai, all of Japan

[73] Assignee: Toyota Jidosha Kabushiki Kaisha & Kabushiki Kaisha Toyota Chuo Kenkyusho, Aichi-ken, Japan

[21] Appl. No.: 575,250

[22] Filed: Dec. 20, 1995

[30] Foreign Application Priority Data

Dec. 26, 1994 [JP] Japan .................................. 6-337253
Oct. 2, 1995 [JP] Japan .................................. 7-278338

[51] Int. Cl.$^6$ .................................................. B60C 23/00
[52] U.S. Cl. ........................... 701/36; 73/146.2; 340/444
[58] Field of Search ..................... 364/423.098, 424.045, 364/508; 73/146, 146.2; 340/442, 443, 444; 201/1, 36

[56] References Cited

U.S. PATENT DOCUMENTS

| | | | |
|---|---|---|---|
| 4,149,140 | 4/1979 | Evans et al. | 340/58 |
| 4,224,597 | 9/1980 | Dicecio | 340/58 |
| 4,817,421 | 4/1989 | Himmler | 73/146 |
| 5,299,131 | 3/1994 | Haas et al. | 364/426.03 |
| 5,343,741 | 9/1994 | Nishihara et al. | 73/146.2 |
| 5,497,657 | 3/1996 | Taguchi et al. | 73/146.2 |
| 5,531,110 | 7/1996 | Ohashi et al. | 73/146 |
| 5,553,491 | 9/1996 | Naito et al. | 73/146.5 |
| 5,557,552 | 9/1996 | Naito et al. | 364/565 |
| 5,561,415 | 10/1996 | Dieckmann | 340/444 |
| 5,583,483 | 12/1996 | Baumann | 340/444 |
| 5,589,815 | 12/1996 | Nishihara et al. | 340/444 |
| 5,596,141 | 1/1997 | Nishikawa et al. | 73/146.2 |
| 5,606,122 | 2/1997 | Taguchi et al. | 73/146.2 |

FOREIGN PATENT DOCUMENTS

| | | |
|---|---|---|
| A1-0 555 073 | 8/1993 | European Pat. Off. . |
| A-0 578 826 | 1/1994 | European Pat. Off. . |
| A0 636 503 | 2/1995 | European Pat. Off. . |
| A-2 241 672 | 9/1991 | United Kingdom . |
| A-2 270 167 | 3/1994 | United Kingdom . |

*Primary Examiner*—Michael Zanelli
*Attorney, Agent, or Firm*—Oliff & Berridge, PLC

[57] ABSTRACT

In a tire air pressure estimation based upon vibration components extracted from a vehicle wheel speed signal, when the vehicle is a driven vehicle wheel, the precision of estimation is improved by canceling the components of vibration due to the resonance of the drive system from the vibration components based upon which the estimation calculation is made. The vibration components due to the resonance of the drive system can be canceled by canceling those vibration components extracted from the vehicle wheel speed signal which are the same in the phase between left and right driven vehicle wheels. When the tire air pressure of one of a pair of left and right driven vehicle wheels is lower than that of the other, the lower tire air pressure is more correctly estimated. Therefore, the higher tire air pressure may be estimated according to the lower tire air pressure against the drive system resonance.

10 Claims, 14 Drawing Sheets

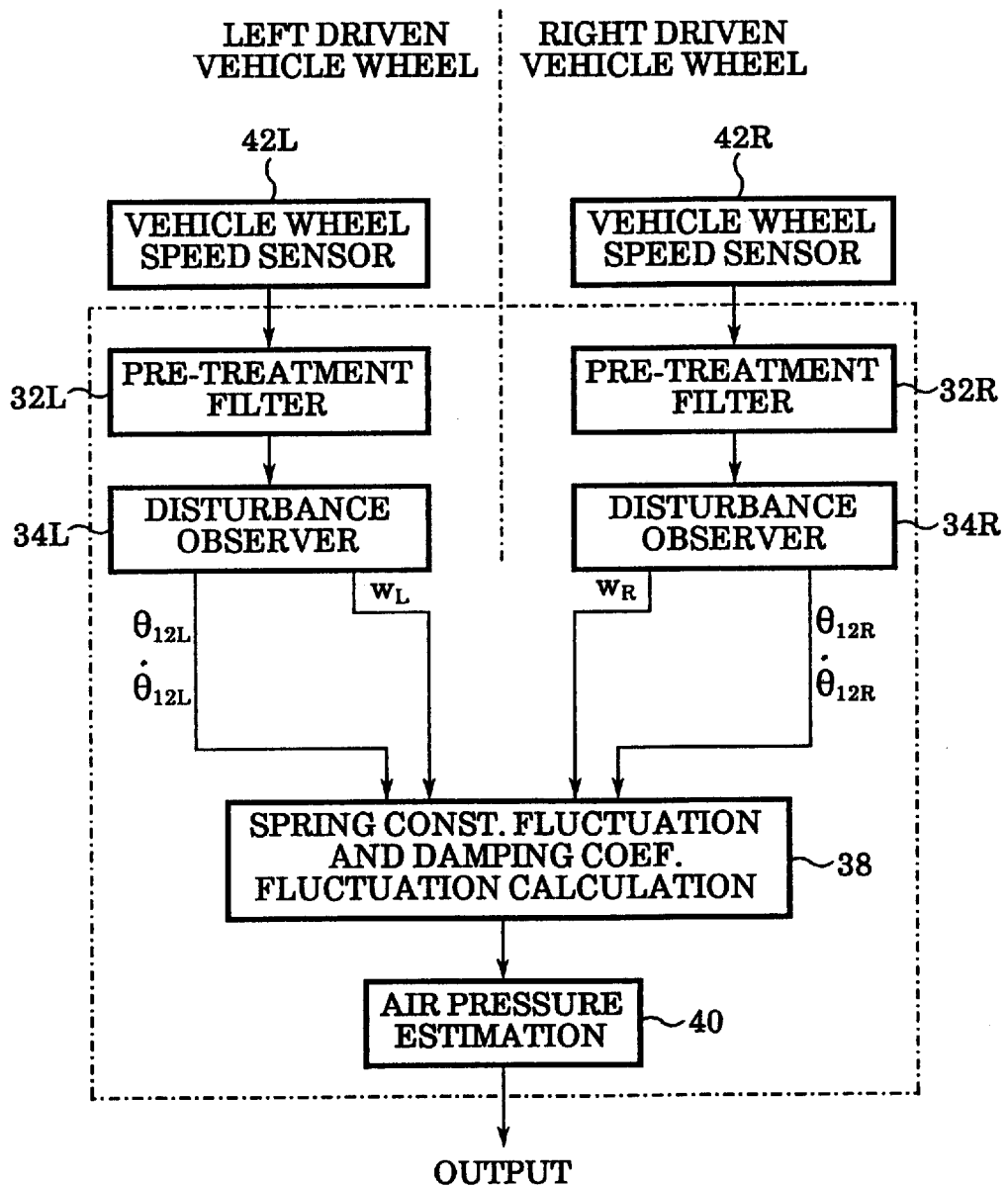

LEFT DRIVEN VEHICLE WHEEL

RIGHT DRIVEN VEHICLE WHEEL

LEFT DRIVEN VEHICLE WHEEL

RIGHT DRIVEN VEHICLE WHEEL

LEFT DRIVEN VEHICLE WHEEL

RIGHT DRIVEN VEHICLE WHEEL

LEFT DRIVEN VEHICLE WHEEL

RIGHT DRIVEN VEHICLE WHEEL

LEFT DRIVEN VEHICLE WHEEL

RIGHT DRIVEN VEHICLE WHEEL

LOW PRESSURE SIDE

HIGH PRESSURE SIDE

LEFT DRIVEN VEHICLE WHEEL

RIGHT DRIVEN VEHICLE WHEEL

LEFT DRIVEN VEHICLE WHEEL

RIGHT DRIVEN VEHICLE WHEEL ated by the present inventors with respect to the above-mentioned# DEVICE FOR ESTIMATING AIR PRESSURE OF TIRE FROM VIBRATION COMPONENTS OF VEHICLE WHEEL SPEED

BACKGROUND OF THE INVENTION

1. Field of the Invention

The present invention relates to a device for estimating air pressure of tires of automobiles or the like, and more particularly to a device for estimating the tire air pressure based upon a vehicle wheel speed signal and the spring constant of the tire.

2. Description of the Related Art

There have been proposed various devices for estimating the air pressure of tires which utilize a certain relationship between the air pressure and the spring constant of a tire and that there is a certain relationship between the spring constant and the resonance frequency of a tire, so as to extract vibration components of vehicle wheel speed due to vibration of a tire from a vehicle wheel speed signal detected with respect to the vehicle wheel, then to obtain the resonance frequency of the tire in the vertical or the longitudinal direction based upon the vibration components, and then to estimate the air pressure of the tire, as is described in, for example, Japanese Patent Laid-open Publication 6-122304 of an application filed by one of the assignees of the present application.

By employing such a tire air pressure estimation device which estimates the tire air pressure based upon the resonant vibration components of the vehicle wheel speed, it is possible to estimate the tire air pressure without any means such as a pressure sensor that directly detects the air pressure of the tire.

However, according to the experimental researches conducted by the inventors of the present application, it was known that, although the above-mentioned conventional tire air pressure estimation devices can correctly estimate the tire air pressure of a non-driven vehicle wheel, they can not correctly estimate tire air pressure of a driven vehicle wheel. As a result of further experimental researches conducted by the present inventors with respect to the above-mentioned problems, it was confirmed that the incorrect estimation by the conventional devices are due to the resonant vibration components of the differential gear and the suspension member included in the vibration components of a driven vehicle wheel. Therefore, it was contemplated that it is still possible to correctly estimate the tire air pressure of a driven vehicle wheel by excluding the resonant effects of the drive system of the driven vehicle wheel.

SUMMARY OF THE INVENTION

Therefore, it is a principal object of the present invention to provide a device for estimating air pressure of a tire of a vehicle wheel of a vehicle such as an automobile by which the tire air pressure of a driven vehicle wheel is correctly estimated.

According to the present invention, the above-mentioned principal object is accomplished by a device for estimating air pressure of a tire of a driven vehicle wheel of a vehicle having a drive system which operates to drive said driven vehicle wheel, comprising: means for detecting vehicle wheel speed of said driven vehicle wheel to provide a vehicle wheel speed signal; means for extracting vibration components from said vehicle wheel speed signal; means for canceling from said extracted vibration components those vibration components which are originated in the operation of said drive system to provide a modified vibration signal; and means for estimating a tire air pressure based upon said modified vibration signal of vehicle wheel speed.

According to the results of the experimental researches conducted by the present inventors, as will be described in detail hereinbelow, when a pair of left and right vehicle wheels are driven by a common drive system including a differential gear and a related suspension member, the vehicle wheel speed signal of each of the left and right driven vehicle wheels includes longitudinal and pitching resonance components of the drive system and those resonance components are the same in the phase between the left and right driven vehicle wheels. Therefore, the resonance components originated in the operation of the drive system can be canceled by obtaining a difference between the vehicle wheel speed signals of the left and right driven vehicle wheels. The resonance components of the tire itself are particular to each of the left and right vehicle wheels, and are therefore not canceled by obtaining the difference between the vehicle wheel speed signals of the left and right vehicle wheels.

Therefore, it is a further object of the present invention to provide a device for estimating tire air pressure of the above-mentioned basic construction, which estimates tire air pressure of each of a pair of left and right driven vehicle wheels by utilizing a difference between said extracted vibration components obtained with respect to the left and right driven vehicle wheels.

Further, according to the results of the experimental researches conducted by the present inventors, as will be described in detail hereinbelow, when the tire air pressure is estimated by canceling the resonance components of the drive system according to the difference of the extracted vibration components of the left and right driven vehicle wheels, if the tire air pressure of one of the left and right driven vehicle wheels is substantially lower than that of the other, although the tire air pressure of the lower pressure side is correctly estimated, the tire air pressure of the higher pressure side is estimated to be lower than it really is due to an influence of the lower pressure side.

In view of the above-mentioned problem, it is a further object of the present invention to provide a device for estimating tire air pressure of the above-mentioned basic construction, which provides a correct estimation of the air pressure of the high pressure side tire when a pair of left and right driven vehicle wheels have a substantial unbalance in the tire pressure thereof, by estimating a first tire air pressure of each of the left and right driven vehicle wheels based upon said extracted vibration components, then comparing said first estimated tire air pressures of the left and right driven vehicle wheels to determine lower and higher tire air pressure sides and also to obtain a difference between said first estimated tire air pressures of the left and right driven vehicle wheels, then canceling the resonance effects of the drive system from said extracted vibration components of the low pressure side to obtain the modified vibration signal thereof, then estimating the tire air pressure of the lower pressure side based upon the modified vibration signal therefor, and then estimating the tire air pressure of the high pressure side by compensating said first estimated tire air pressure thereof with said difference.

Further, according to the results of the experimental researches conducted by the present inventors, when the tire air pressure is estimated based upon the above-mentioned modified vibration signal, when one of the left and right driven vehicle wheels runs on a projection of the road surface such as a cat's eye or the like, the estimated value of the tire air pressure of said one vehicle wheel abruptly deviates from the actual value thereof due to an abrupt change of the magnitude of the disturbance input thereto.

In view of the above, it is a further object of the present invention to provide a device for estimating the tire air pressure of the above-mentioned basic construction, which obtains deviations of disturbance input to a driven vehicle wheel from the road surface within a predetermined period, and stops the estimation of tire air pressure when the deviations exceed a threshold value predetermined therefor. In this connection, it will be more efficient for the device that it is so constructed the check of the magnitude of the disturbance is made after the vibration components have been extracted from the vehicle wheel speed signal but before the extracted vibration components signal is processed for the cancellation of the resonance components of the drive system to produce the modified vibration signal.

Further, it was noted that there is a certain relationship between the air pressure and the loaded radius of the rolling tires of vehicles such as automobiles, and that it is also possible to estimate the tire air pressure of those vehicles if the tire air pressure of a standard vehicle wheel and the loaded radius of the standard vehicle wheel and a certain vehicle wheel is known. Therefore, based upon the above knowledge that the non-driven vehicle wheel is not affected by the resonance of the drive system, it is hereby contemplated to correctly estimate the tire air pressure of a driven vehicle wheel by using the non-driven vehicle wheel as the standard vehicle wheel.

Therefore, it is a further object of the present invention to provide a device for estimating air pressure of a tire of a driven vehicle wheel of a vehicle also having a non-driven vehicle wheel, comprising means for detecting vehicle wheel speed of said non-driven vehicle wheel to provide a non-driven vehicle wheel speed signal, means for extracting vibration components due to vibration of a tire of said non-driven vehicle wheel from said non-driven vehicle wheel speed signal, means for estimating air pressure of the tire of said non-driven vehicle wheel based upon said extracted vibration components, means for detecting loaded radius of each of said non-driven vehicle wheel and said driven vehicle wheel, and means for estimating the air pressure of the tire of said driven vehicle wheel based upon the tire air pressure of said non-driven vehicle wheel and the loaded radius of each of said non-driven and driven vehicle wheels.

BRIEF DESCRIPTION OF THE DRAWINGS

In the accompanying drawings,

FIG. 5 is a block diagram showing the conventional disturbance observer type tire air pressure estimation device;

DESCRIPTION OF THE PREFERRED EMBODIMENTS

In the following, the present invention will be described in more detail with respect to several embodiments with reference to the accompanying drawings.

First embodiment

Preceding the descriptions of the first embodiment, the principle of estimation of tire air pressure according to this embodiment will first be described.

According to the results of the experimental researches conducted by the present inventors, there is observed a phenomenon of resonance with respect to driven vehicle wheels which is not observed with respect to non-driven vehicle wheels. This particular phenomenon of resonance is due to a longitudinal resonance of the differential gear and the suspension member and a pitching resonance of the differential gear. Analyzing the force which a tire receives from a road surface to a vertical force, a longitudinal force and a rotational moment, the longitudinal force excites a longitudinal resonance of the differential gear and the suspension member, while the rotational moment excites a pitching resonance of the differential gear.

Figure 2:
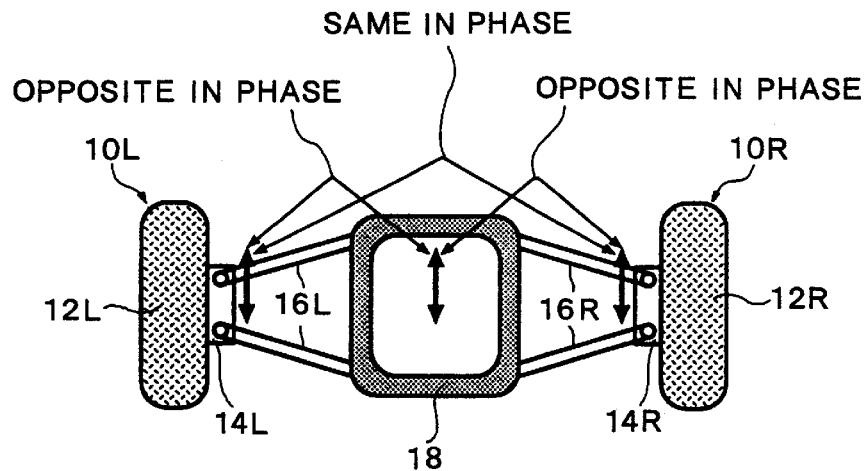
FIG. 2 is a diagrammatic plan view showing the longitudinal resonance of the suspension member.
Figure 3:
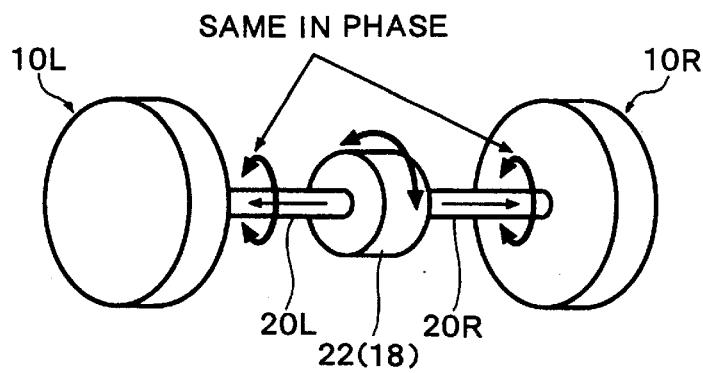
FIG. 3 is a diagrammatic perspective view showing the pitching resonance of the differential gear.

FIG. 2 is a diagrammatic plan view showing the longitudinal resonance of the suspension member, and FIG. 3 is a diagrammatic perspective view showing the pitching resonance of the differential gear.

In these figures, 10L and 10R show left and right driven vehicle wheels, respectively, wherein the left and right driven vehicle wheels 10L and 10R include tires 12L and 12R and corresponding wheels (not shown in the figures) rotatably supported by carriers 14L and 14R supported from a suspension member 18 via pairs of suspension arms 16L and 16R, while the driven vehicle wheels 10L and 10R are adapted to be driven for rotation by a differential gear 22 via drive shafts 20L and 20R, respectively.

According to the results of the experiments conducted by the present inventors, the suspension member 18 and the differential gear 22 vibrate in a common phase, i.e. as a unitary body, as shown in FIGS. 2 and 3, so that the longitudinal resonance of the driven vehicle wheels 10L and 10R are each a vibration relative to the suspension member 18 and the differential gear 22 in the direction opposite to that of the suspension member 18 and the differential gear 22, via the suspension arms 16L and 16R, while the pitching resonance of the left and right driven vehicle wheels 10L and 10R are each an angular oscillation relative to the differential gear 22 (and the suspension member 18) in the direction opposite to that of the differential gear 22 (and the suspension member 18), via the drive shafts 20L and 20R.

The frequency of the longitudinal resonance and the frequency of the pitching resonance fluctuate according to running conditions of the vehicle. This is considered to be due to the non-linearity of the mount springs and the longitudinal springs included in the suspension member. Therefore, it is difficult to simulate the suspension member and the differential gear by a model of springs and mass points at high accuracy to compensate for the resonance of the drive system.

Therefore, in this embodiment, noting that the resonance of the drive system is the same in the phase between the left and right driven vehicle wheels, it is investigated to utilize this fact to cancel the influence of the resonance of the drive system.

According to the results of the experiments conducted by the present inventors, the difference between the vehicle wheel speed signals of the left and right driven vehicle wheels exhibits almost no longitudinal and pitching resonance, implying that the longitudinal resonance and the pitching resonance are the same in the phase and in the amplitude between the left and right driven vehicle wheels. On the other hand, since the resonance components of the tire of each of the left and right driven vehicle wheels are each particular to each of the left and right driven vehicle wheels, they are not canceled in the difference between the vehicle wheel speed signals of the left and right driven vehicle wheels. Therefore, it is considered to be possible to estimate the tire air pressure of each of the left and right driven vehicle wheels with no influence of the resonance of the drive system by calculating the difference between the vehicle wheel speed signals of the left and right driven vehicle wheels to compensate for the effects of the resonance of the drive system.

Figure 4:
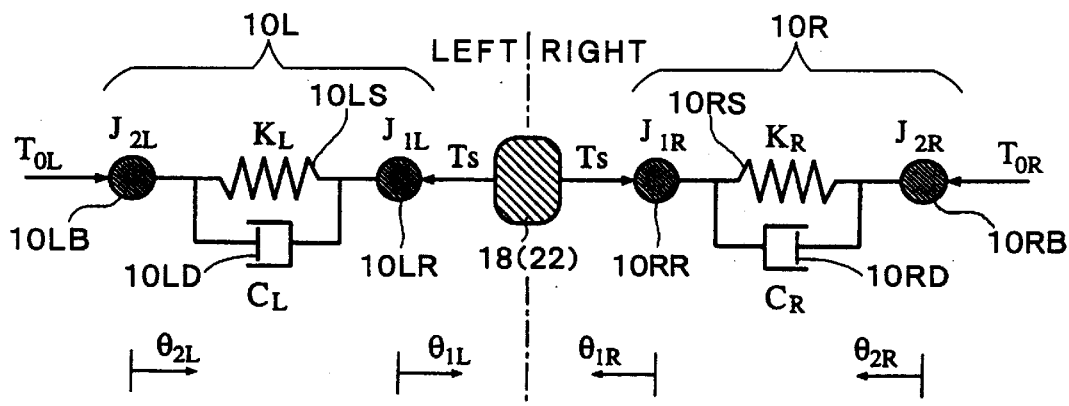
FIG. 4 is a diagram showing the vibration model of left and right driven vehicle wheels.

As shown in FIG. 4, assuming that the left and right driven vehicle wheels 10L and 10R are made of rim side masses 10LR and 10RR, belt side masses 10LB and 10RB, and springs 10LD and 10RD and dampers 10LS, 10RS positioned therebetween, a model which substitutes the rotational movement of the left and right driven vehicle wheels by a linear movement thereof for the purpose of convenience is investigated hereinbelow.

In FIG. 4, suffixes L and R indicate that the parameters are for the left and right vehicle wheels, respectively $T_{OL}$ and $T_{OR}$ show the disturbance from the road surface, Ts shows a torque applied to the driven vehicle wheels due to the longitudinal and pitching resonances of the suspension member 18 and the differential gear 22 (the same in the phase between left and right); $J_{1L}$ and $J_{1R}$ show rim inertia; $J_{2L}$ and $J_{2R}$ show belt inertia; $\theta_{1L}$ and $\theta_{1R}$ show rim rotational displacement (whose differentiation is vehicle wheel speed); $\theta_{2L}$ and $\theta_{2R}$ are belt rotational displacement; $K_L$ and $K_R$ show spring constant of the tire; and $C_L$ and $C_R$ show damping coefficient of the tire.

The equations of motion of the left and right driven vehicle wheels by the model shown in FIG. 4 are the following formulas 1 and 2, respectively.

$$\begin{cases} J_{1L}\ddot{\theta}_{1L} = -K_L(\theta_{1L} - \theta_{2L}) - C_L(\dot{\theta}_{1L} - \dot{\theta}_{2L}) - T_s \\ J_{2L}\ddot{\theta}_{2L} = K_L(\theta_{1L} - \theta_{2L}) + C_L(\dot{\theta}_{1L} - \dot{\theta}_{2L}) + T_{0L} \end{cases} \quad (1)$$

$$\begin{cases} J_{1R}\ddot{\theta}_{1R} = -K_R(\theta_{1R} - \theta_{2R}) - C_R(\dot{\theta}_{1R} - \dot{\theta}_{2R}) - T_s \\ J_{2R}\ddot{\theta}_{2R} = K_R(\theta_{1R} - \theta_{2R}) + C_R(\dot{\theta}_{1R} - \dot{\theta}_{2R}) + T_{0R} \end{cases} \quad (2)$$

The equations of status of the left and right driven vehicle wheels of the model shown in FIG. 4 are the following formulas 3 and 4, respectively $$\frac{d}{dt}\begin{bmatrix} \dot{\theta}_{1L} \\ \dot{\theta}_{2L} \\ \theta_{12L} \end{bmatrix} = \begin{bmatrix} -\frac{C_L}{J_{1L}} & \frac{C_L}{J_{1L}} & -\frac{K_L}{J_{1L}} \\ \frac{C_L}{J_{2L}} & -\frac{C_L}{J_{2L}} & \frac{K_L}{J_{2L}} \\ 1 & -1 & 0 \end{bmatrix} \begin{bmatrix} \dot{\theta}_{1L} \\ \dot{\theta}_{2L} \\ \theta_{12L} \end{bmatrix} + \begin{bmatrix} -\frac{T_s}{J_{1L}} \\ \frac{T_{0L}}{J_{2L}} \\ 0 \end{bmatrix} \quad (3)$$

$$\frac{d}{dt}\begin{bmatrix} \dot{\theta}_{1R} \\ \dot{\theta}_{2R} \\ \theta_{12R} \end{bmatrix} = \begin{bmatrix} -\frac{C_R}{J_{1R}} & \frac{C_R}{J_{1R}} & -\frac{K_R}{J_{1R}} \\ \frac{C_R}{J_{2R}} & -\frac{C_R}{J_{2R}} & \frac{K_R}{J_{2R}} \\ 1 & -1 & 0 \end{bmatrix} \begin{bmatrix} \dot{\theta}_{1R} \\ \dot{\theta}_{2R} \\ \theta_{12R} \end{bmatrix} + \begin{bmatrix} -\frac{T_s}{J_{1R}} \\ \frac{T_{0R}}{J_{2R}} \\ 0 \end{bmatrix} \quad (4)$$

In formulas 3 and 4, $$\theta_{12L} = \theta_{1L} - \theta_{2L}$$

$$\theta_{12R} = \theta_{1R} - \theta_{2R}$$

Looking at the left driven vehicle wheel, the dimension of the disturbance of formula 3 is secondary, but since vehicle wheel speed only is detectable, the disturbance can be estimated only by primary dimension. Therefore, herein the first element of the disturbance is estimated. Assuming that the spring constant $K_L$ as a parameter deviates to $K_L + \Delta K_L$, while the damping coefficient $C_L$ as another parameter deviates to $C_L + \Delta C_L$, the disturbance with respect to the left vehicle wheel is expressed by the following formula 5, and in the same manner the disturbance with respect to the right driven vehicle wheel is expressed by the following formula 6. In formulae 5 and 6, $T'_{OL}$ and $T'_{OR}$ express the effects of the disturbance from the road surface.

$$w_L = -\frac{\Delta C_L}{J_{1L}} \dot{\theta}_{1L} + \frac{\Delta C_L}{J_{1L}} \dot{\theta}_{2L} - \frac{\Delta K_L}{J_{1L}} \theta_{12L} - \frac{T_s}{J_{1L}} + \frac{T_{0L}}{J_{1L}} \quad (5)$$

$$= -\frac{\Delta C_L}{J_{1L}} \dot{\theta}_{12L} - \frac{\Delta K_L}{J_{1L}} \theta_{12L} - \frac{T_s}{J_{1L}} + \frac{T_{0L}}{J_{1L}}$$

$$w_R = -\frac{\Delta C_R}{J_{1R}} \dot{\theta}_{12R} - \frac{\Delta K_R}{J_{1R}} \theta_{12R} - \frac{T_s}{J_{1R}} + \frac{T_{0R}}{J_{1R}} \quad (6)$$

When disturbance observers designed according to the same conditions are used for the left and right driven vehicle wheels, the same phase relationship between the left and the right is also maintained with respect to the estimated disturbances. Therefore, the effects of the resonance of the drive system can also be canceled by the difference between the left and right estimated disturbances as shown by the following formula 7. (Herein it is assumed that rim inertia $J_{1L}$ and $J_{1R}$ of the left and right vehicle wheels are known.)

$$w \triangleq J_{1L} w_L - J_{1R} w_R \quad (7)$$

Formula 7 is rewritten as formula 8 by calculation and arrangement, so that the term of the same phase component Ts is canceled.

$$w = [-\Delta K_L \ \Delta K_R \ -\Delta C_L \ \Delta C_R] \begin{bmatrix} \theta_{12L} \\ \theta_{12R} \\ \dot{\theta}_{12L} \\ \dot{\theta}_{12R} \end{bmatrix} + T_{0L} - T_{0R} \quad (8)$$

Therefore, by obtaining fluctuations $\Delta K_L$ and $\Delta K_R$ of the spring constant and fluctuations $\Delta C_L$ and $\Delta C_R$ of the damping coefficient according to the formula 8 and the least square method, it is possible to obtain the tire air pressure not affected by the resonance of the drive system. The following formula 9 is the equation of the least square method.

$$\begin{bmatrix} -\Delta K_L \\ \Delta K_R \\ -\Delta C_L \\ \Delta C_R \end{bmatrix} = \left\{ \sum_{i=1}^{N} \zeta(i)\zeta^T(i) \right\}^{-1} \left\{ \sum_{i=1}^{N} w(i)\zeta(i) \right\} \quad (9)$$

wherein $$\zeta(i) = [\theta_{12L}(i) \ \theta_{12R}(i) \ \dot{\theta}_{12L}(i) \ \dot{\theta}_{12R}(i)]^T$$

Figure 1:
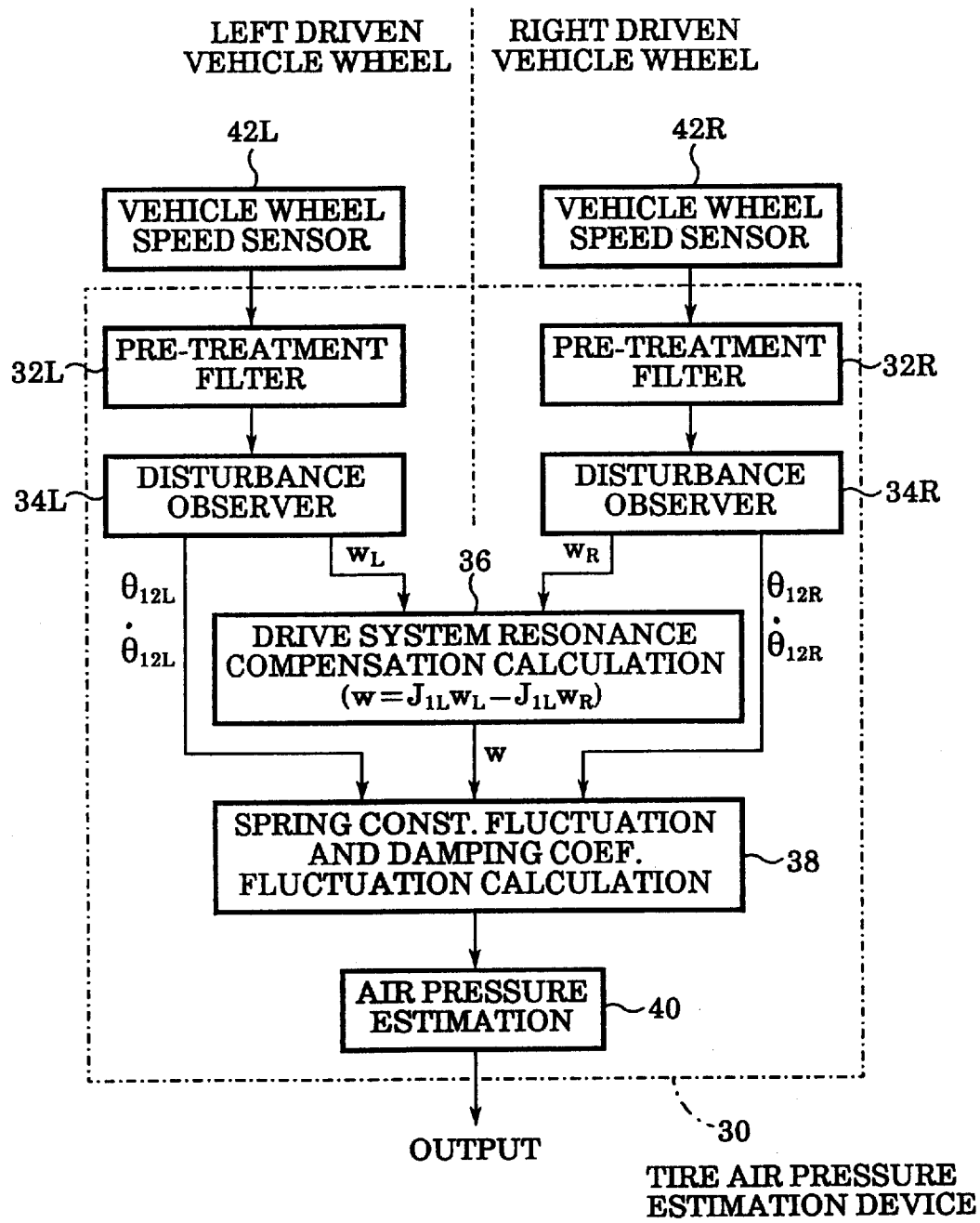
FIG. 1 is a block diagram showing a first embodiment of the tire air pressure estimation device according to the present invention constructed based upon a drive system resonance compensation algorithm.

FIG. 1 is a block diagram showing a first embodiment of the tire air pressure estimation device according to the present invention, constructed based upon the above-mentioned algorithm of the resonance compensation of the drive system.

In FIG. 1, the tire air pressure estimation device 30 comprises pretreatment filters 32L and 32R, disturbance observers 34L and 34R, a driving system resonance compensation calculation block 36, a spring constant fluctuation and damping coefficient fluctuation calculation block 38, and an air pressure estimation block 40. The pre-treatment filters 32L and 32R are input with vehicle wheel speed $V_L$ and $V_R$ of the left and right driven vehicle wheels from vehicle wheel speed sensors 42L and 42R, respectively, each filtering the vehicle wheel speed signal so that those vibration components outside of an upper and a lower cut off frequency are eliminated.

The disturbance observers 34L and 34R calculate estimated disturbances $w_L$ and $w_R$ of the left and right driven vehicle wheels including the drive system resonance components according to the above-mentioned formulas 5 and 6 based upon the vehicle wheel speed signals processed by the pre-treatment filters 32L and 32R, and also calculate skew angles $\theta_{12L}$ and $\theta_{12R}$ and skew angular velocities $\dot{\theta}_{12L}$ and $\dot{\theta}_{12R}$ of the tires of the left and right driven vehicle wheels, respectively The drive system resonance compensation calculation block 36 calculates an estimated disturbance w cleared off of the effects of the drive system resonance according to the above-mentioned formula 7 based upon the estimated disturbances of the left and right driven vehicle wheels. The spring constant fluctuation and damping coefficient fluctuation calculation block 38 calculates fluctuations $\Delta K_L$ and $\Delta K_R$ of the spring constant and fluctuations $\Delta C_L$ and $\Delta C_R$ of the damping coefficient of the tires according to the least square method of the above-mentioned formula 9 based upon the estimated disturbance w, the tire skew angles $\theta_{12L}$ and $\theta_{12R}$ and the tire skew angular velocities $\dot{\theta}_{12L}$ and $\dot{\theta}_{12R}$, respectively. Finally, the air pressure estimation block 40 calculates tire air pressures $P_L$ and $P_R$ of the tires of the left and right driven vehicle wheels based upon the above fluctuations.

It is to be noted that the tire air pressure estimation device 30 may actually be a micro-computer having a central processing unit (CPU), a read only memory (ROM), a random access memory (RAM), input and output port means and a bi-directional common bus interconnecting these elements and adapted to calculate the tire air pressures $P_L$ and $P_R$ according to the above-mentioned processes. This is the same with respect to the below-mentioned other embodiments.

FIG. 5 is a block diagram showing a conventional disturbance observer type tire air pressure estimation device. In FIG. 5, the portions corresponding to those shown in FIG. 1 are designated by the same reference numerals.

As is seen in FIG. 5, this conventional tire air pressure estimation device has no drive system resonance compensation calculation block 36 of the embodiment shown in FIG. 1, and therefore the spring constant fluctuation and damping coefficient fluctuation calculation block 38 calculates fluctuations of the spring constant and the damping coefficient based upon the estimated disturbances $w_L$ and $w_R$ including the resonance components of the suspension member, etc. calculated by the disturbance observers 34L and 34R.

As will be appreciated from the comparison of FIGS. 1 and 5, according to the first embodiment, the fluctuations of the spring constant and the damping coefficient are calculated based upon the estimated disturbance w cleared off of the influence of the drive system resonance by the drive system resonance compensation calculation block 36, and based thereupon the tire air pressures $P_L$ and $P_R$ are calculated, whereby the tire air pressures of the driven vehicle wheels are more correctly estimated than available by the conventional tire air pressure estimation device shown in FIG. 5.

Now the effects of the first embodiment will be described based upon the data obtained by the driving tests of a vehicle conducted according to the driving conditions shown in the following Table 1.

Table 1

Road surface: rough concrete road and stepped asphalt road (the roughness of the road surface is greater in the rough concrete road than in the stepped asphalt road)

Vehicle speed: constant 60 km/h and constant 90 km/h

Air pressure: 1.0 kgf/cm–2.0 kgf/cm$^2$
(Measurement was made with respect to cases where the air pressure was lowered simultaneously at the left and right driven vehicle wheels (called "both wheels lowered" hereinbelow) and cases where the air pressure of the left driven vehicle wheel was lowered, while the air pressure of the right driven vehicle wheel was kept at 2.0 kgf/cm$^2$ (called "one side wheel lowered" hereinbelow).

Running mode: self driving (with drive shaft) and pulled running (no drive shaft)

The following matters are considered to be effective for evaluating the effectiveness of the air pressure estimation:

(A) How the estimated values scatter according to the running conditions.

(B) How the estimated values in the self driving are close to the estimated values in the pulled running (nearly equal to estimated values of non-driven vehicle wheel).

(C) How small the interference between left and right driven vehicle wheels is in "one side wheel lowered".

The results of the estimation conducted by the conventional device shown in FIG. 5 and the first embodiment shown in FIG. 1 under the running conditions of the above Table 1 are shown in FIGS. 6A–9B. In these figures, legends p and q indicate the rough concrete road and the stepped asphalt road, respectively, and legends d and n indicate the self drive running and the pulled running (non-driven), respectively. The numerical values following these legends indicate vehicle speed by km/h.

FIGS. 6A–B and 7A–B show the results of the estimation obtained by the conventional device and the first embodiment with respect to the case of the "both wheels lowered", wherein the abscissa shows set air pressure of each driven vehicle wheel, while the ordinate shows fluctuation rate of the estimated tire spring constant against set air pressure. The fluctuation rate of spring constant herein concerned means the ratio of the fluctuations of the estimated spring constant to the spring constant actually preset for the running tests.

From FIGS. 6A–B and 7A–B it will be appreciated that (A1) on the rough road, the accuracy of estimation is lower in the conventional device than in the first embodiment (The reason is considered to be a greater vibration of the drive system.); and (A2) the scattering of the estimated values is decreased by the drive system resonance compensation with respect to both of the left and right driven vehicle wheels, such that the estimated values during self driving approach to the estimated values during pulled running.

FIGS. 8A–B and 9A–B show the results of the estimation obtained by the conventional device and the first embodiment in the case of the "one side wheel lowered", wherein the abscissa shows set air pressure of the left driven vehicle wheel at which the air pressure was lowered, while the ordinate shows the fluctuation rate of the estimated spring constant of the tire of each of the left and right vehicle wheels. From FIGS. 8A–B and 9A–B it will be appreciated that (A3) the accuracy of the estimation of the left driven vehicle wheel at which the air pressure was lowered is improved by the drive system resonance compensation, and (A4) although it is ideally expected that the estimated value of the right driven vehicle wheel at which the air pressure was unchanged remains unchanged, the estimated value of the right driven vehicle wheel also lowers with the lowering of the air pressure of the left driven vehicle wheel, and such a linking phenomenon is more distinct when the drive system resonance compensation is made.

The lowering of the estimated value of the right driven vehicle wheel which occurs accompanying the lowering of the air pressure of the left driven vehicle wheel is considered to be due to an interference of vibrations of the left and right vehicle wheels. Further, the magnified lowering of the estimated value of the right driven vehicle wheel by the drive system resonance compensation is considered to be due to a mixing of the vehicle wheel speed signals of the left and right driven vehicle wheels according to the calculation of the difference between the vehicle wheel speeds of the left and right driven vehicle wheels, thereby magnifying the extent of said interference.

Although not shown in the figure, as a result of investigation of the power spectrum density of the vehicle wheel speeds of the left and right driven vehicle wheels, phase relationship between the left and right driven vehicle wheels, and the difference between the vehicle wheel speeds of the left and right driven vehicle wheels in the state of the "one side wheel lowered", it was known that, when the air pressure of the left driven vehicle wheel is at or around 1.2 kgf/cm$^2$, a resonance component of the left driven vehicle wheel emerges in the power spectrum density of the vehicle wheel speed of the right driven vehicle wheel, showing that an interference of the left and right driven vehicle wheels occurred. It was also known that no resonance component emerges in the difference between the vehicle wheel speeds of the left and right driven vehicle wheels, and it appears that the principal resonance components belong to the lower pressure side (left driven vehicle wheel). The reason for this is considered to be that, because the tire resonance amplitude of the vehicle wheel speed increases as the air pressure lowers, the resonance components of the high pressure side in the difference signal relatively decreases, so that the resonance component of the lower pressure side occupied a large part of the resonance components in the difference signal. Although it is expected that the estimated value of the lower pressure side should increase relative to the actual value thereof due to the interference of the high pressure side as a result of the interference between the left and right driven vehicle wheels, the influence of the low pressure side on the high pressure side is relatively small because of the above reasons.

As will be appreciated from the above investigations of the results (A1)–(A4), according to the first embodiment, when the extent of the lowering of the air pressure of one of a pair of driven vehicle wheels relative to the other is small, it is possible to exclude the influence of the drive system resonance on the estimation by the drive system resonance compensation in the case where the tire air pressure lowers in both of the left and right vehicle wheels and also in the case where the tire air pressure lowers in one of the left and right vehicle wheels, whereby it is possible to estimate the tire air pressure at a higher accuracy than in the conventional device.

Second embodiment

As in the descriptions of the first embodiment, prior to the descriptions of the second embodiment, the principle of estimation of the tire air pressure according to the second embodiment will be described.

As will be noted in the above, although the drive system resonance compensation conducted in the first embodiment is very effective when the tire air pressure of each of the left and right driven vehicle wheel lowers to the same extent, when the tire air pressures of the left and right driven vehicle wheels are different from each other to a great extent, the error in the estimation of the tire air pressure of the higher pressure side rather increases by the drive system resonance compensation. Therefore, in the second embodiment, it is contemplated to compensate the tire air pressure of the higher pressure side driven vehicle wheel according to the difference of the estimated values before and after the drive system resonance compensation.

Figure 6A:
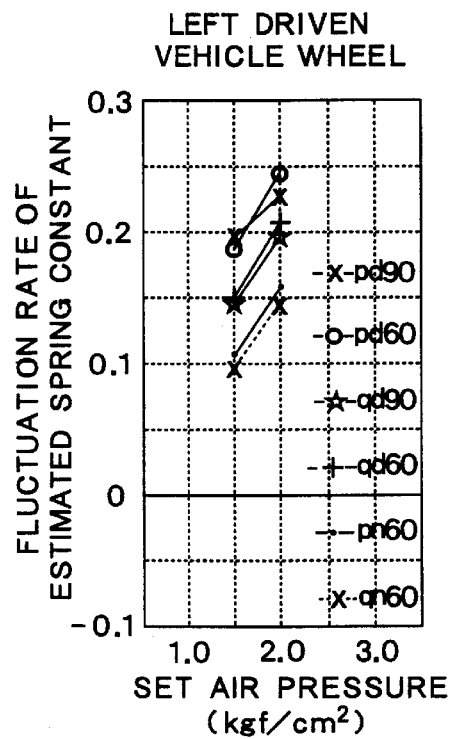
FIGS. 6A and 6B are graphs showing the relationship between set air pressure and fluctuation rate of spring constant estimated by a conventional device with respect to left and right driven vehicle wheels, respectively, at both of which the tire air pressure lowers.
Figure 6B:
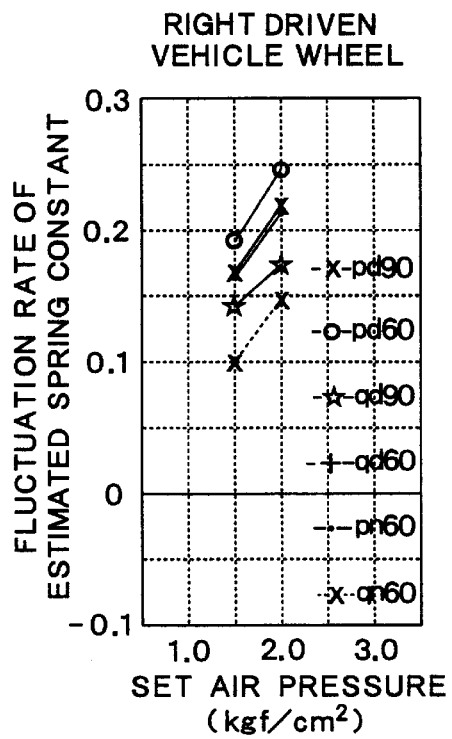
Figure 7A:
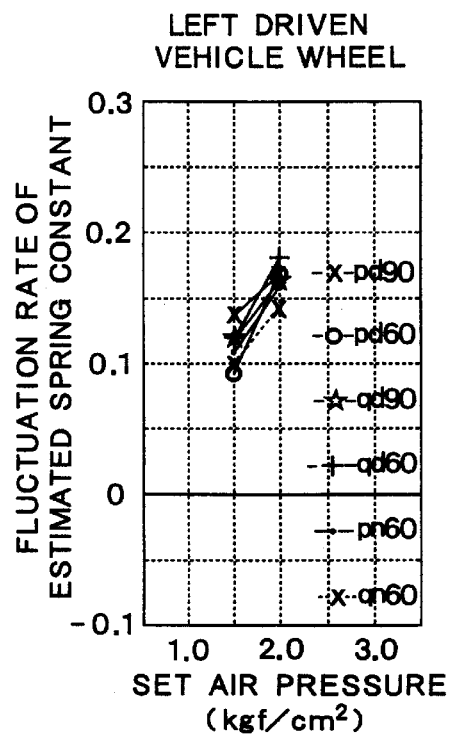
FIGS. 7A and 7B are graphs showing the relationship between set air pressure fluctuation rate of spring constant estimated by a first embodiment of the present invention with respect to left and right driven vehicle wheels, respectively, at both of which the tire air pressure lowers.
Figure 7B:
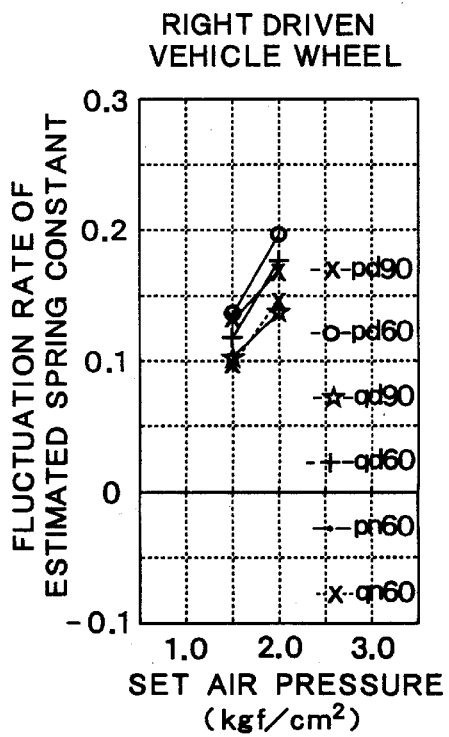
Figure 8:
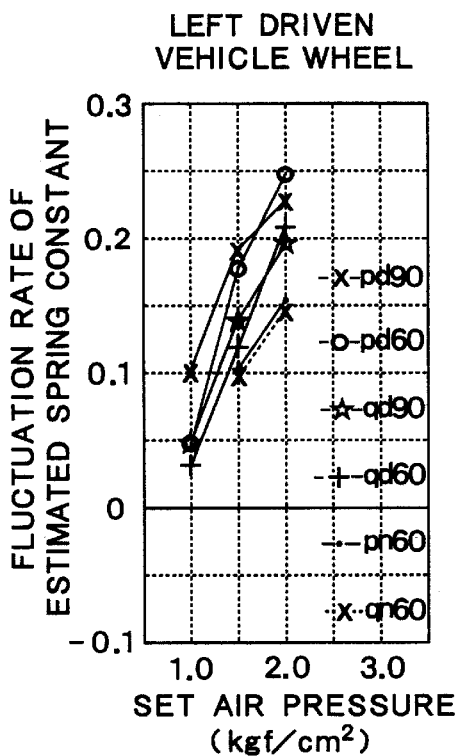
FIGS. 8A and 8B are graphs showing the relationship between set air pressure and fluctuation rate of spring constant of the tire estimated by the conventional device with respect to a left driven vehicle wheel at which the tire air pressure lowers and a right driven vehicle wheel, respectively.
Figure 8:
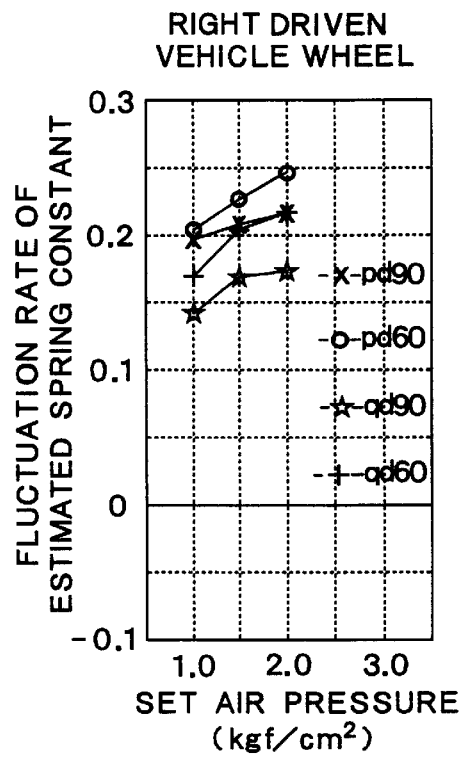
Figure 9:
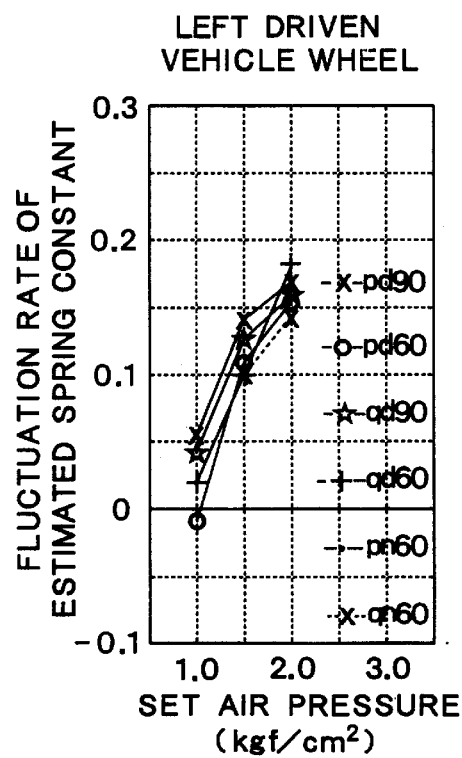
FIGS. 9A and 9B are graphs showing the relationship between set air pressure and fluctuation rate of spring constant of the tire estimated by the first embodiment with respect to a left driven vehicle wheel at which the tire air pressure lowers and a right driven vehicle wheel, respectively.
Figure 9:
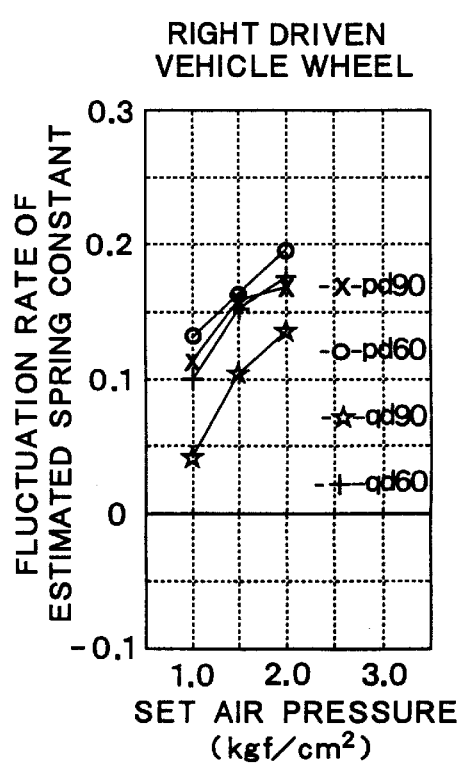

As will be noted in FIGS. 6A and 6B, although the magnitude of scattering of the estimated values of the tire air pressure by the conventional device is relatively great, the principal factor of the scattering is not in the gradient of the estimated values relative to the set air pressure, i.e. the change of the estimated values relative to the change of the set air pressure, and that the respective lines will lie one over the other when they are shifted in parallel with the ordinate, or in other words, the scattering is an offset along the ordinate. Therefore, as will be understood from the comparison of FIGS. 6A–B and 7A–B, the drive system resonance compensation conducted by the first embodiment is to decrease the offset along the ordinate.

By simplifying formulas 5 and 6, the estimated disturbances of the left and right driven vehicle wheels are expressed by the following formulas 10 and 11:

$$w_L = -\frac{\Delta K_L}{J_{1L}} x_{12L} - \frac{T_s}{J_{1L}} + \frac{T_{0L}}{J_{1L}} \tag{10}$$

$$w_R = -\frac{\Delta K_R}{J_{1R}} x_{12R} - \frac{T_s}{J_{1R}} + \frac{T_{0R}}{J_{1R}} \tag{11}$$

In order to estimate fluctuations $\Delta K_L$ and $\Delta K_R$ of the spring constant, a correlation between the disturbance and skew angle is obtained and the correlation is divided by a self correlation of the skew angle, whereby the following formulas 12 and 13 are obtained:

$$\frac{\Phi_{w_L x_{12L}}}{\Phi_{x_{12L}}} = -\frac{\Delta K_L}{J_{1L}} - \frac{1}{J_{1L}} \frac{\Phi_{T_s x_{12L}}}{\Phi_{x_{12L}}} + \frac{1}{J_{1L}} \frac{\Phi_{T_{0L} x_{12L}}}{\Phi_{x_{12L}}} \tag{12}$$

$$\frac{\Phi_{w_R x_{12R}}}{\Phi_{x_{12R}}} = -\frac{\Delta K_R}{J_{1R}} - \frac{1}{J_{1R}} \frac{\Phi_{T_s x_{12R}}}{\Phi_{x_{12R}}} + \frac{1}{J_{1R}} \frac{\Phi_{T_{0R} x_{12R}}}{\Phi_{x_{12R}}} \tag{13}$$

As will be noted in formulas 12 and 13, the estimated value is equal to the fluctuation $\Delta K_L$ or $\Delta K_R$ desired to be obtained plus the correlation of the road surface disturbance and the resonance Ts of the differential gear and the suspension member as an offset. With respect to the third item of the right side of formulas 12 and 13f for the road surface disturbance, it was experimentally known that this term is constant regardless of vehicle running conditions and tire air pressure, and therefore, it is considered that the scattering of the estimated values is due to the second term for the correlation of the resonance of the differential gear and the suspension member.

On the other hand, the estimated value obtained through the drive system resonance compensation is expressed by canceling the second term of the correlation of the resonance of the differential gear and the suspension member from the above formulas 12 and 13, as expressed by the following formulas 14 and 15:

$$\frac{\Phi_{w_L x_{12L}}}{\Phi_{x_{12L}}} = -\frac{\Delta K_L}{J_{1L}} + \frac{1}{J_{1L}} \frac{\Phi_{T_{0L}-T_{0R} x_{12L}}}{\Phi_{x_{12L}}} \tag{14}$$

$$\frac{\Phi_{w_R x_{12R}}}{\Phi_{x_{12R}}} = -\frac{\Delta K_R}{J_{1R}} + \frac{1}{J_{1R}} \frac{\Phi_{T_{0R}-T_{0L} x_{12R}}}{\Phi_{x_{12R}}} \tag{15}$$

Figure 10:
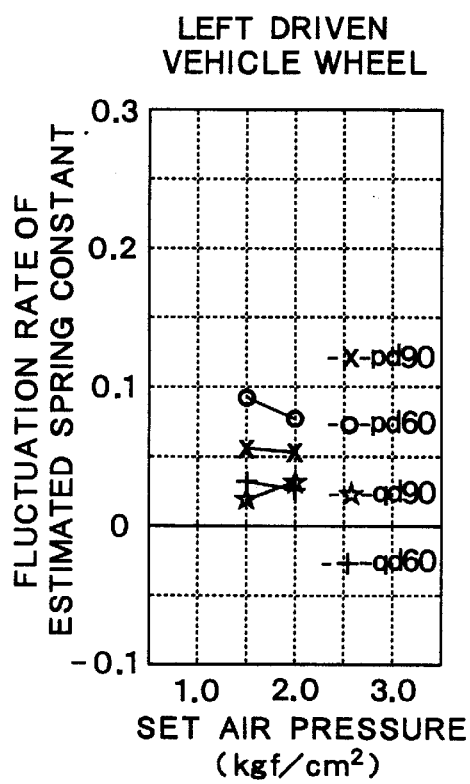
FIGS. 10A and 10B are graphs showing the relationship between set air pressure and the difference between fluctuation rates of spring constant of the tire estimated by the conventional device and the first embodiment, respectively, with respect to left and right driven vehicle wheels, respectively, at both of which the tire air pressure lowers.
Figure 10:
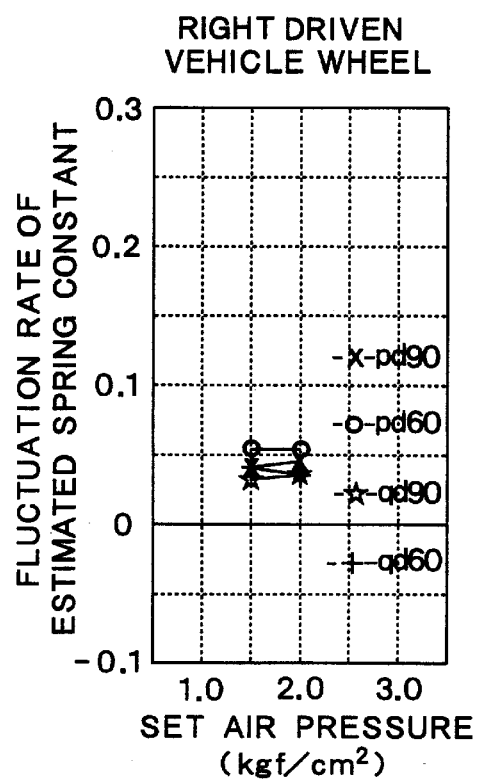

Therefore, by subtracting the estimated value obtained through the drive system resonance compensation from the estimated value obtained by the conventional device, it is possible to know the effects of the resonance of the differential gear and the suspension member on the estimated value. The results that the estimated values obtained through the drive system resonance compensation were subtracted from the estimated values by the conventional device are shown in FIG. 10.

As will be noted from FIGS. 10A and 10B, the effects of the resonance of the differential gear and the suspension member is dependent upon the road surface conditions and the vehicle speed, but substantially much less dependent upon the air pressure. (The lines are substantially horizontal.) The difference of the estimated values between the left and right driven vehicle wheels is also small.

Therefore, it is assumed that (B1) the effects of the resonance of the differential gear and the suspension member are not dependent upon the air pressure; and (B2) the effects of the resonance of the differential gear and the suspension member are substantially the same in the left and right driven vehicle wheels.

In other words, it is assumed that when the left and right driven vehicle wheels roll on a same road surface with a same air pressure, the air pressures estimated with respect to the left and right driven vehicle wheels are substantially the same.

Further, from the results of the drive system resonance compensation conducted when the air pressures of the left and right driven vehicle wheels are different from one another, i.e. the "one side wheel lowered", it is noted that (B3) the low pressure side is not affected (or little affected) by the high pressure side, and the estimated values after the drive system resonance compensation of the low pressure side (the estimated values of the left driven vehicle wheel) are reliable; and (B4) conversely, the high pressure side is liable to be affected by the low pressure side, and the estimated values of the high pressure side after the drive system resonance compensation (the estimated values of the right driven vehicle wheel) are poor in the reliability.

Thus, in the second embodiment, in consideration of the above matters B1–B4, the air pressures of the left and right driven vehicle wheels are estimated according to the following manner:

(C1) The air pressures of the left and right driven vehicle wheels are individually estimated in the same manner as in the estimation by the conventional tire air pressure estimation device. The estimated values of air pressure of the left and right driven vehicle wheels thus obtained are expressed as $\delta_{L1}$ and $\delta_{R1}$, respectively. wheels thus obtained are expressed as $\delta_{L1}$ and $\delta_{R1}$, respectively.

(C2) The air pressures of the left and right driven vehicle wheels are estimated as compensated for the drive system resonance according to the above-mentioned formula 8 based upon the difference of the disturbances input to the left and right driven vehicle wheels. The air pressures of the left and right driven vehicle wheels thus obtained with the drive system resonance compensation are expressed as $\delta_{L2}$ and $\delta_{R2}$, respectively.

(C3) According to the relative magnitude of $\delta_{L1}$ and $\delta_{R1}$, the estimated value of the high pressure side is compensated to obtain the estimated air pressures $\delta_L$ and $\delta_R$ of the left and right driven vehicle wheels. In other words, when $\delta_{L1}$ is equal to or greater than $\delta_{R1}$, the estimated air pressures $\delta_L$ and $\delta_R$ are obtained according to the following formula 16, whereas when $\delta_{L1}$ is smaller than $\delta_{R1}$, the estimated air pressures $\delta_L$ and $\delta_R$ are obtained according to the following formula 17:

$$\begin{cases} m \triangleq \delta_{R1} - \delta_{R2} \\ \delta_L = \delta_{L1} - m \\ \delta_R = \delta_{R2} \end{cases} \tag{16}$$

$$\begin{cases} m \triangleq \delta_{L1} - \delta_{L2} \\ \delta_L = \delta_{L2} \\ \delta_R = \delta_{R1} - m \end{cases} \tag{17}$$

Figure 11:
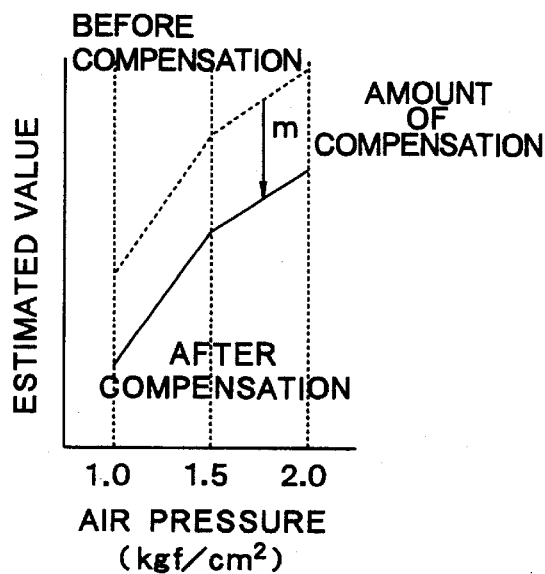
FIGS. 11A and 11B are diagrams illustrating a high pressure side modification algorithm of a second embodiment.
Figure 11:
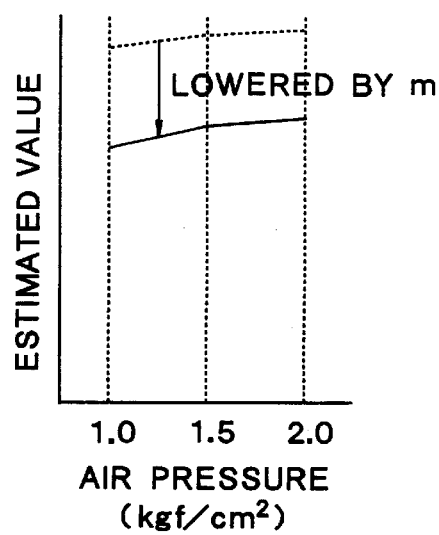

FIGS. 11A and 11B show the outline of the algorithm of the above-mentioned compensation for the high pressure side. As shown in FIGS. 11A, first, according to the conventional estimation method, estimated values of the left and right driven vehicle wheels are obtained (broken lines "BEFORE COMPENSATION"), and then, based upon these, it is determined which sides are the low and high pressure sides. Then the drive system resonance compensation is conducted with respect to the low pressure side, and the estimated value after the drive system resonance compensation is made as the estimated value of the low pressure side (solid line in the left side), while obtaining at the same time the amount of the drive system resonance compensation m, i.e. the difference between the estimated value before the drive system resonance compensation and the estimated value after the drive system resonance compensation. Then, the estimated value of the high pressure side is lowered by the amount m of the drive system resonance compensation of the low pressure side, thus obtaining the estimated value of the high pressure side (solid line in the right side).

In other words, the algorithm of the high pressure compensation is that, since the reliability of the estimated value of the high pressure side compensated for the drive system resonance is low when a one side air pressure is lower than the other, the compensation is not directly made for the high pressure side, but the estimated value of the high pressure side is indirectly compensated by the drive system resonance compensation m of the low pressure side. Since the both sides air pressure drop is deemed as a particular case of the one side air pressure lowering (the case of $\delta_{L1}=\delta_{R1}$ in the above-mentioned (C3)), this compensation algorithm is considered to be applicable to any air pressure lowering of the left and right driven vehicle wheels.

Figure 12:
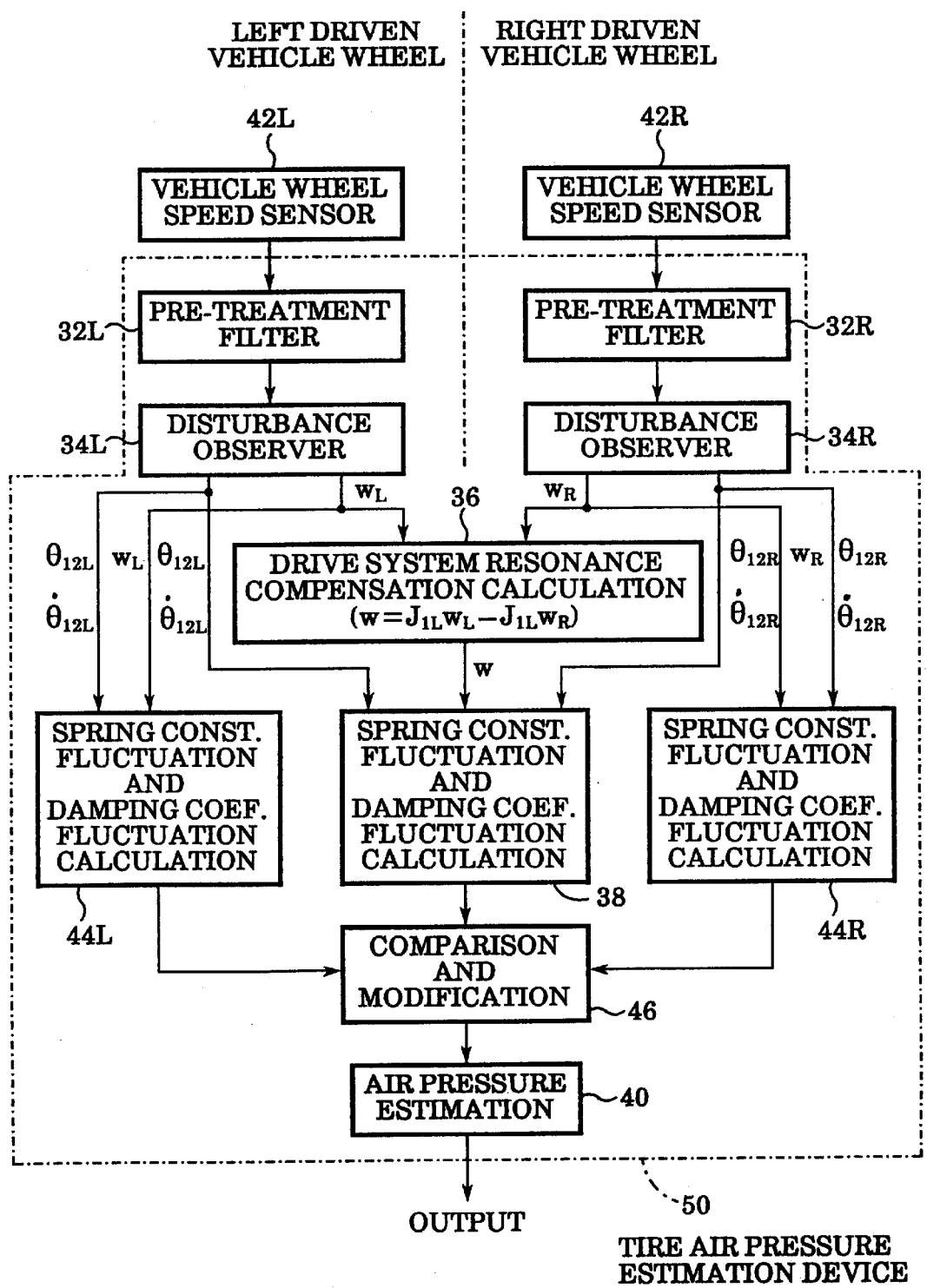
FIG. 12 is a block diagram showing the second embodiment of the tire air pressure estimation device according to the present invention constructed based upon the drive system resonance compensation and the high pressure side modification algorithm.
Figure 13:
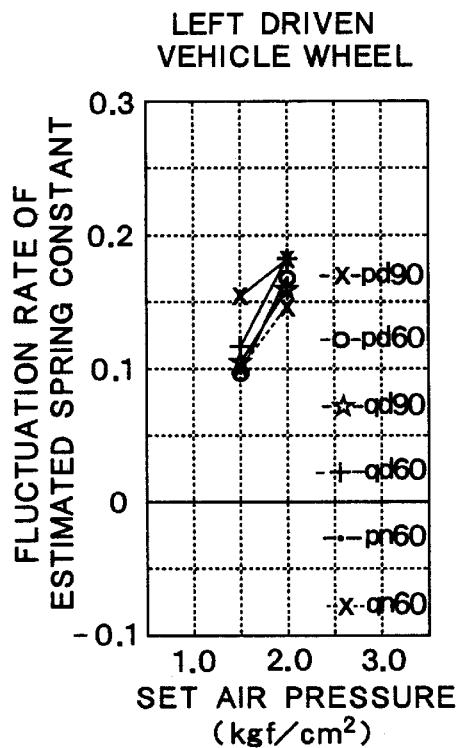
FIGS. 13A and 13B are graphs showing the relationship between set air pressure and fluctuation rate of spring constant of the tire estimated by the second embodiment with respect to left and right driven vehicle wheels, respectively, at both of which the tire air pressure lowers.
Figure 13:
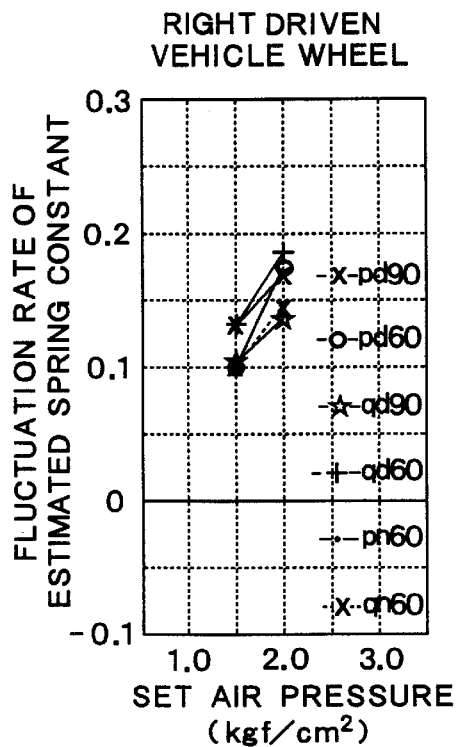
Figure 14:
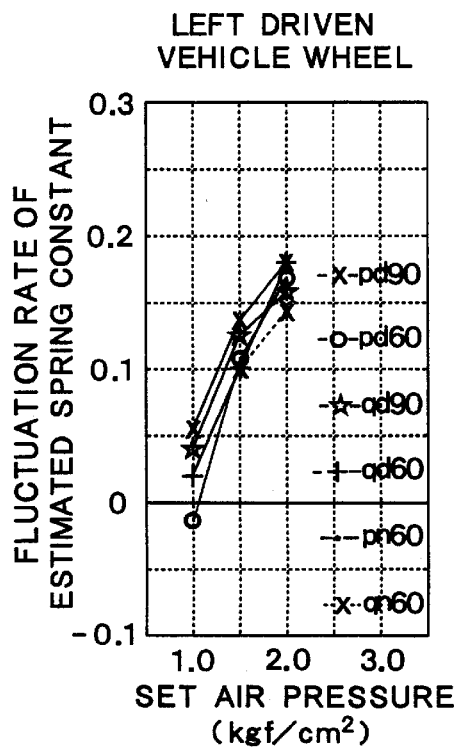
FIGS. 14A and 14B are graphs showing the relationship between set air pressure and fluctuation rate of spring constant of the tire estimated by the second embodiment with respect to a left driven vehicle wheel at which the tire air pressure lowers and a right driven vehicle wheel, respectively.
Figure 14:
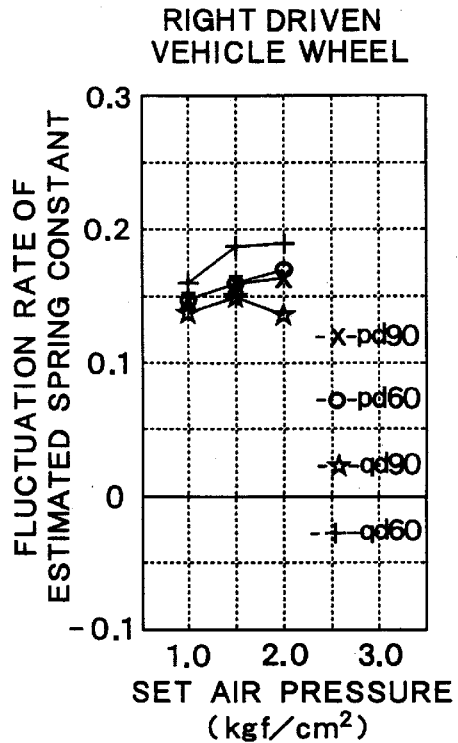

FIG. 12 is a block diagram showing the second embodiment of the tire air pressure estimation device according to the present invention constructed based upon the above-mentioned algorithm of the drive system resonance compensation and the high pressure side compensation. In FIG. 12, the portions corresponding to those shown in FIG. 1 are designated by the same reference numerals as in FIG. 1.

As will be noted in FIG. 12, the tire air pressure estimation device 50 according to this embodiment comprises spring constant fluctuation and damping coefficient fluctuation calculation blocks 44L and 44R and a comparison and compensation block 46, in addition to the pretreatment filters 32L and 32R, the disturbance observers 34L and 34R, the drive system resonance compensation calculation block 36, the spring constant fluctuation and damping coefficient fluctuation calculation block 38, and the air pressure estimation block 40 of the first embodiment.

The spring constant fluctuation and damping coefficient fluctuation calculation blocks 44L and 44R calculate the amount of fluctuations of the spring constant and the damping coefficient based upon the signals received from the disturbance observers 34L and 34R showing the estimated disturbances $w_L$ and $w_R$ including the resonance components of the suspension member, etc., signals showing skew angles $\theta_{12L}$ and $\theta_{12R}$ of the tires of the left and right driven vehicle wheels and signals showing skew angular velocities $\dot{\theta}_{12L}$ and $\dot{\theta}_{12R}$ of the tires of the left and right driven vehicle wheels, respectively. The comparison and compensation block 46 calculates the estimated values $\delta_{L1}$ and $\delta_{R1}$ of the tire air pressures before the drive system resonance compensation based upon the signals received from the spring constant fluctuation and damping coefficient fluctuation calculation blocks 44L and 44R showing the fluctuations of the spring constant and the damping coefficient and compares the obtained estimated values, and then compensates the estimated value of the high pressure side by the difference m between the estimated values before and after the drive system resonance compensation of the low pressure side. The air pressure estimation block 40 outputs signals for setting the air pressure of the low pressure side to the estimated value after the drive system resonance compensation and for setting the air pressure of the high pressure side to the estimated value after the above-mentioned indirect compensation.

As will be understood by the comparison of FIGS. 1 and 12, according to the second embodiment, the air pressure of the low pressure side is directly compensated for the drive system resonance, while the estimated value of the high pressure side is indirectly compensated by the difference between the estimated values of the low pressure side before and after the drive system resonance compensation thereof. By such an arrangement, it is possible to correctly estimate the tire air pressures of the driven vehicle wheels not only when a tire air pressure lowering occur at the both sides driven vehicle wheels but also when a tire air pressure lowering occurs only at a one side driven vehicle wheel, to be more correct than the first embodiment.

FIGS. 13A–B and 14A–B show the results of testing obtained by the second embodiment based upon the running conditions shown in Table 1. As will be appreciated by the comparison of FIGS. 9A–9B and FIGS. 14A–14B, the scattering of the estimated values of the air pressure of the high pressure side (right driven vehicle wheel) in the "one side wheel lowering" is improved, and the influence of the high pressure side on the low pressure side by an interference is also decreased to substantially the same level as in the conventional estimation device.

In the calculations by the least square method in the spring constant fluctuation and damping coefficient fluctuation calculation block 38 and the spring constant fluctuation and damping coefficient fluctuation calculation blocks 44L and 44R in the first and second embodiments, multiplication and addition are so much repeated that if the data are processed in a finite length as in the integer calculation type microprocessors, there is a danger that the result of the square and sum up calculation overflows. Therefore, in order to avoid such an overflow problem, it is desirable that the maximum value of the input to each block is checked at each calculation not to exceed a predetermined value, and the input is appropriately shifted rightward together with the related variables.

Third embodiment

Figure 15:
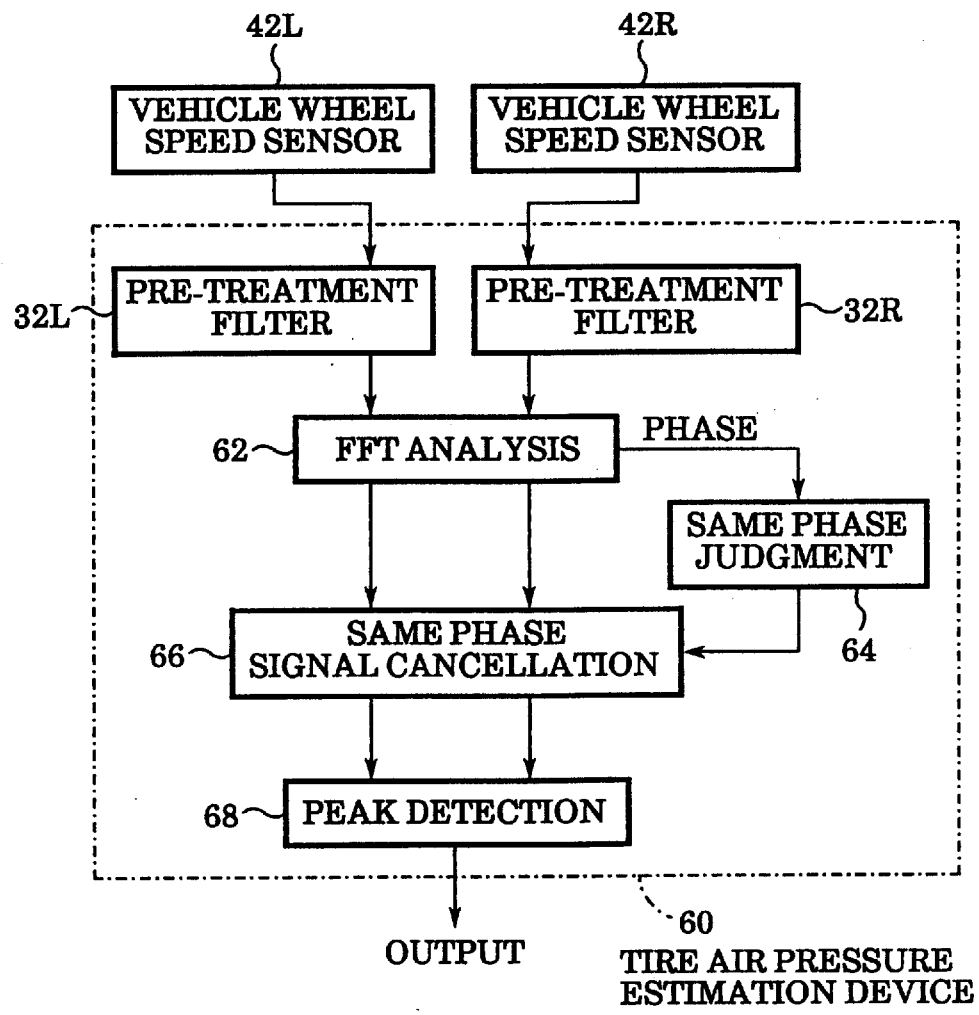
FIG. 15 is a block diagram showing a third embodiment of the tire air pressure estimation device according to the present invention constructed as an FFT type tire air pressure estimation device.

FIG. 15 is a block diagram showing a third embodiment of the tire air pressure estimation device according to the present invention constructed as an FFT type (frequency analysis using Fast Fourier Transformer) tire air pressure estimation device. In FIG. 15, the portions corresponding to those shown in FIG. 1 are also shown by the same reference numerals.

The tire air pressure estimation device 60 of this embodiment also comprises pre-treatment filters 32L and 32R adapted to be input with vehicle wheels speeds $V_L$ and $V_R$ of left and right driven vehicle wheels (not shown in the figure) so that the vehicle wheel speed signals are cut off of frequency components above and below predetermined upper and lower limits. The vehicle wheel speed signals treated by the pretreatment filters 32L and 32R are supplied to an FFT analysis block 62 which makes an FFT analysis based upon the band-pass filtered vehicle wheel speed signals of the left and right driven vehicle wheels so as to calculate frequency response and phase of the vehicle wheel signals of the left and right driven vehicle wheels.

The results of the FFT analysis are supplied to a same phase judgment block 64 and a same phase signal cancellation block 66. The same phase judgment block 64 obtains a frequency band from the results of the FFT analysis in which the phase difference between the vehicle wheel signals of the left and right driven vehicle wheels is zero (same phase band), while the same phase signal cancellation block 66 modifies the frequency response by reducing the gain of the same phase band of the frequency response of the vehicle wheel speed signals of the left and right driven vehicle wheels to zero. Signals showing the modified frequency response are supplied to a peak detection block 68 which detects a peak of the frequency response wave having no same phase components and calculates the tire air pressures of the left and right driven vehicle wheels based upon the frequency of the peak.

Figure 16:
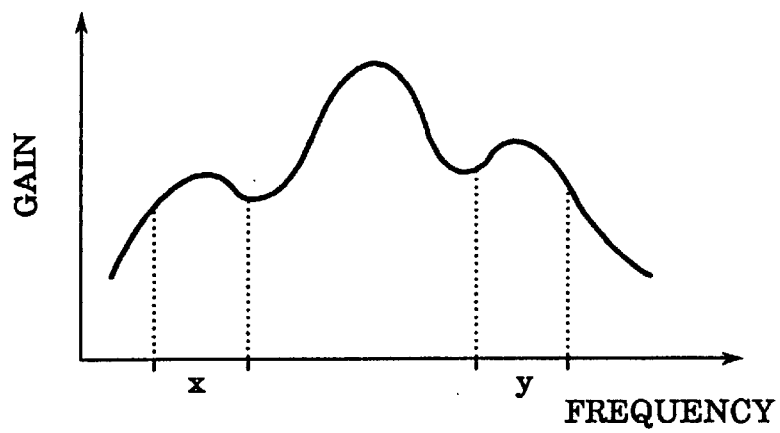
FIGS. 16A, 16B and 16C are graphs of frequency response showing the principle of the tire air pressure estimation of the third embodiment.
Figure 16:
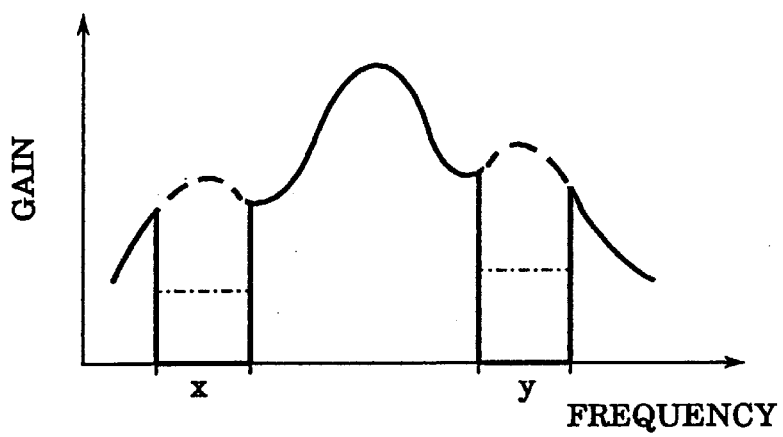
Figure 16:
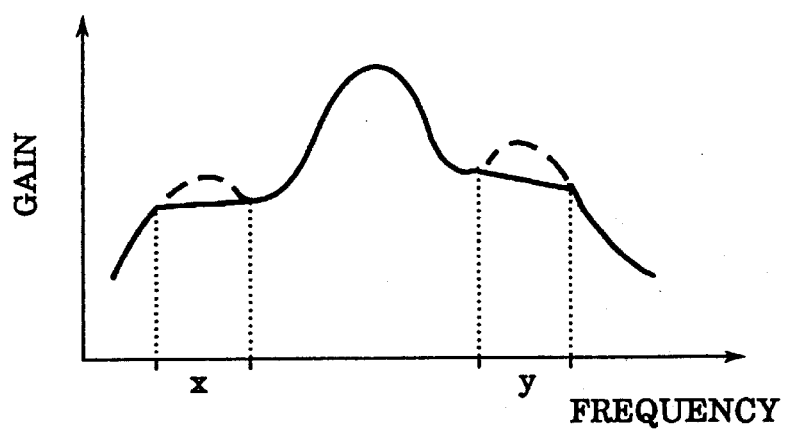

Thus, according to the third embodiment, as shown in FIG. 16A, the same phase bands x and y are judged to correspond to the resonance frequency of the drive system by the same phase judgment block 64 based upon the calculation conducted by the FFT analysis block 62, and then, as shown in FIG. 16B, the wave shape of the frequency response is modified by the same phase signal cancellation block 66 such that the gain of the frequency response of the same phase bands x and y is reduced to zero, and therefore the tire air pressure of the driven vehicle wheels is more precisely estimated, as in the first embodiment, than estimated by the conventional tire air pressure estimation device.

The same phase judgment block 64 of the third embodiment is intended to obtain the frequency bands at which the phase difference between the vehicle wheel speed signals of the left and right driven vehicle wheels is zero. However, since the phase information includes a noise, it is difficult to obtain a frequency band at which the phase difference is exactly zero. In view of this, it may be so arranged that a certain width of band such as, for example, ±45° of the center of 0 is set and in which it is deemed that the phase difference is zero.

Further, in the same phase signal cancellation block 66 of the third embodiment described above, although it is so adapted that the gain of the same phase band of the wave of frequency response of the vehicle wheel speed signal is reduced to zero, the gain may be set, for example, to be between 0 and 1 as shown by a phantom line in FIG. 16B, or the wave shape of the frequency response may be reformed as shown in FIG. 16C according to the gain at opposite borders of the same phase band.

Further, even when the tire air pressure is estimated according to the FFT analysis, the device may be so arranged that the tire air pressures of the left and right driven vehicle wheels are estimated based upon the results of calculation by the FFT analysis block 62, then the air pressure of the low pressure side is modified by the drive system resonance compensation, while the air pressure of the high pressure side is calculated to be lower than the air pressure estimated by the FFT analysis block 62 by the amount of drive system resonance compensation, as in the second embodiment. By such an arrangement, the air pressure at the high pressure side in the "one side wheel lowered" case will be estimated at a higher precision than available by the third embodiment.

Fourth embodiment

Figure 17:
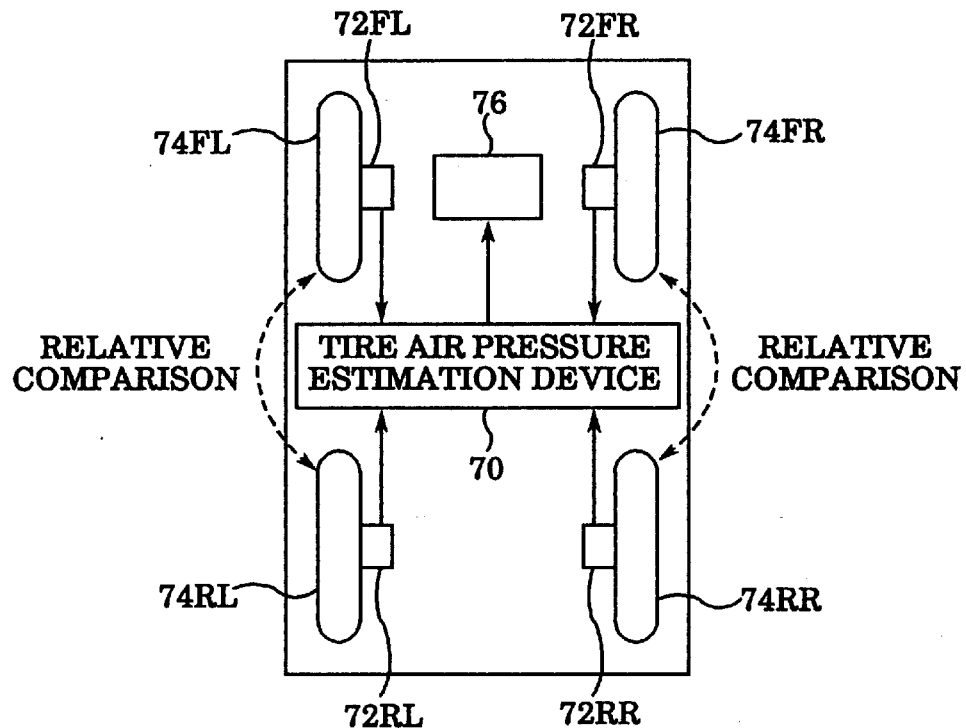
FIG. 17 is a diagrammatic illustration showing a fourth embodiment of the tire air pressure estimation device according to the present invention constructed to estimate the tire air pressure of the whole vehicle wheels.

FIG. 17 is a diagrammatic view showing a fourth embodiment of the tire air pressure estimation device according to the present invention adapted to estimate the tire air pressures of the whole vehicle wheels.

Figure 18:
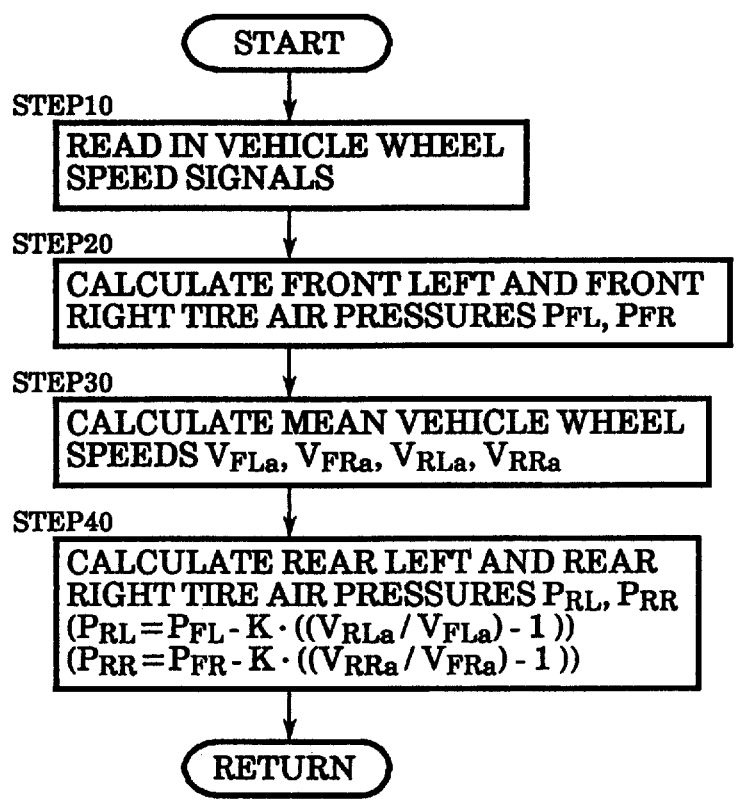
FIG. 18 is a flowchart showing the tire air pressure estimation routine of the fourth embodiment.

In this embodiment, the tire air pressure estimation device 70 is supplied with signals of vehicle wheel speeds $V_{FL}$ and $V_{FR}$ of non-driven front left vehicle wheel 74FL and non-driven front right vehicle wheel 74FR from vehicle wheel speed sensors 72FL and 72FR, respectively, and signals of vehicle wheel speeds $V_{RL}$ and $V_{RR}$ of driven rear left vehicle wheel 74RL and driven rear right vehicle wheel 74RR, respectively, and calculates tire air pressures of the front left and right and rear left and right vehicle wheels according to the routine shown in FIG. 18. The tire air pressures are displayed by display means 76.

In the flowchart of FIG. 18, in step 10 the signals showing the vehicle wheel speeds of the front left and right and rear left and right vehicle wheels are read in, and then in step 20 tire air pressures $P_{FL}$ and $P_{FR}$ of the front left and right vehicle wheels are calculated based upon the vehicle wheel speeds $V_{FL}$ and $V_{FR}$ of the front left vehicle wheel 74FL and front right vehicle wheel 74FR according to the known disturbance observer type or FFT type tire air pressure estimation method.

In step 30, mean values by a predetermined period of the vehicle wheel speed of each of the front left and right and rear left and right vehicle wheels $V_{FLa}$, $V_{FRa}$, $V_{RLa}$ and $V_{RRa}$ are calculated, then in step 40 tire air pressures $P_{RL}$ and $P_{RR}$ of the rear left and right vehicle wheels are calculated according to the following formulas 18 and 19, respectively, by using a factor K. The calculated values are supplied to the display means 76. The ratio $V_{RLa}/V_{FLa}$ in formula 18, i.e. the ratio of the mean values of the vehicle wheel speeds of the rear left and front left vehicle wheels, and the ratio $V_{RRa}/V_{FRa}$ of formula 19, i.e. the ratio of the mean values of the vehicle wheel speeds of the rear right and front right vehicle wheels, are each equal to a reciprocal of the ratio of the loaded radius of the left front and rear vehicle wheels and the right front and rear vehicle wheels, respectively.

$$P_{RL}=P_{FL}-K \cdot ((V_{RLa}/V_{FLa})-1) \tag{18}$$

$$P_{RR}=P_{FR}-K \cdot ((V_{RRa}/V_{FRa})-1) \tag{19}$$

Thus, according to the fourth embodiment, first, the tire air pressures of front left and front right vehicle wheels are estimated in the scale of absolute air pressure based upon the vehicle wheel speed signals of the front left and front right vehicle wheels including no resonance components of the drive system, and then the tire air pressures of the rear left and rear right vehicle wheels are estimated based upon the tire air pressure of the corresponding front vehicle wheels and the ratio of the loaded radius of the front and rear vehicle wheels. Therefore, the tire air pressures of the driven rear left and rear right vehicle wheels are estimated in the scale of absolute air pressure at high accuracy without being affected by the drive system resonance.

Figure 19:
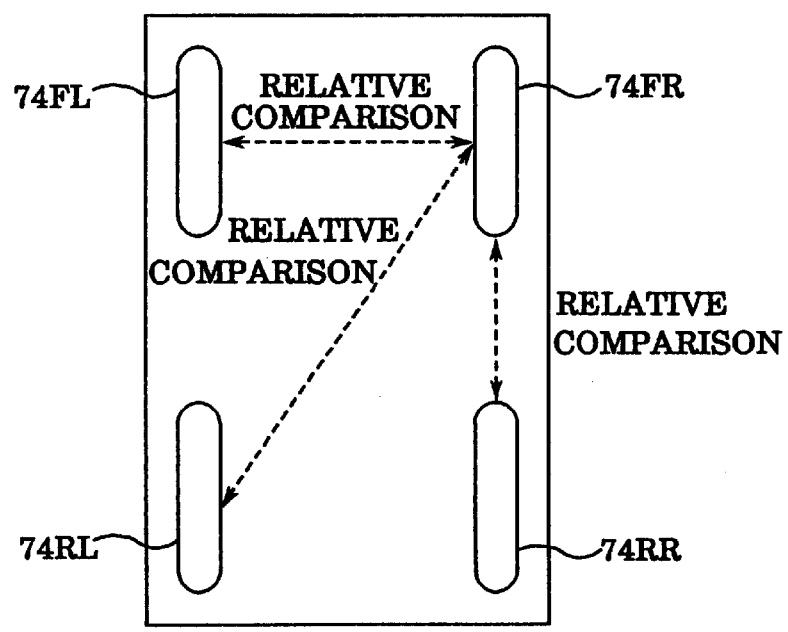
FIG. 19 is a diagrammatic illustration showing the principle of the tire air pressure estimation of the fourth embodiment.

Although in the fourth embodiment described above the tire air pressures $P_{RL}$ and $P_{RR}$ of the rear left and rear right vehicle wheels are calculated based upon the tire air pressures $P_{FL}$ and $P_{FR}$ of the front left and front right vehicle wheels according to the ratio of the loaded radius of the front and rear vehicle wheels, a modification is possible, for example, as shown in FIG. 19, wherein the tire air pressure $P_{FR}$ of the front right vehicle wheel only is calculated according to the disturbance observer type or FFT type tire air pressure estimation method, and the tire air pressures of the other vehicle wheels are calculated based upon the tire air pressure $P_{FR}$ of the front right vehicle wheel according to the ratio of the loaded radius of each vehicle wheel against the front right vehicle wheel. Further, in place of the ratio of the loaded radius of the front and rear vehicle wheels, the tire air pressure may be calculated by employing a difference of the loaded radius between front and rear vehicle wheels (difference of the mean values of the vehicle wheel speeds).

Fifth embodiment

Figure 20:
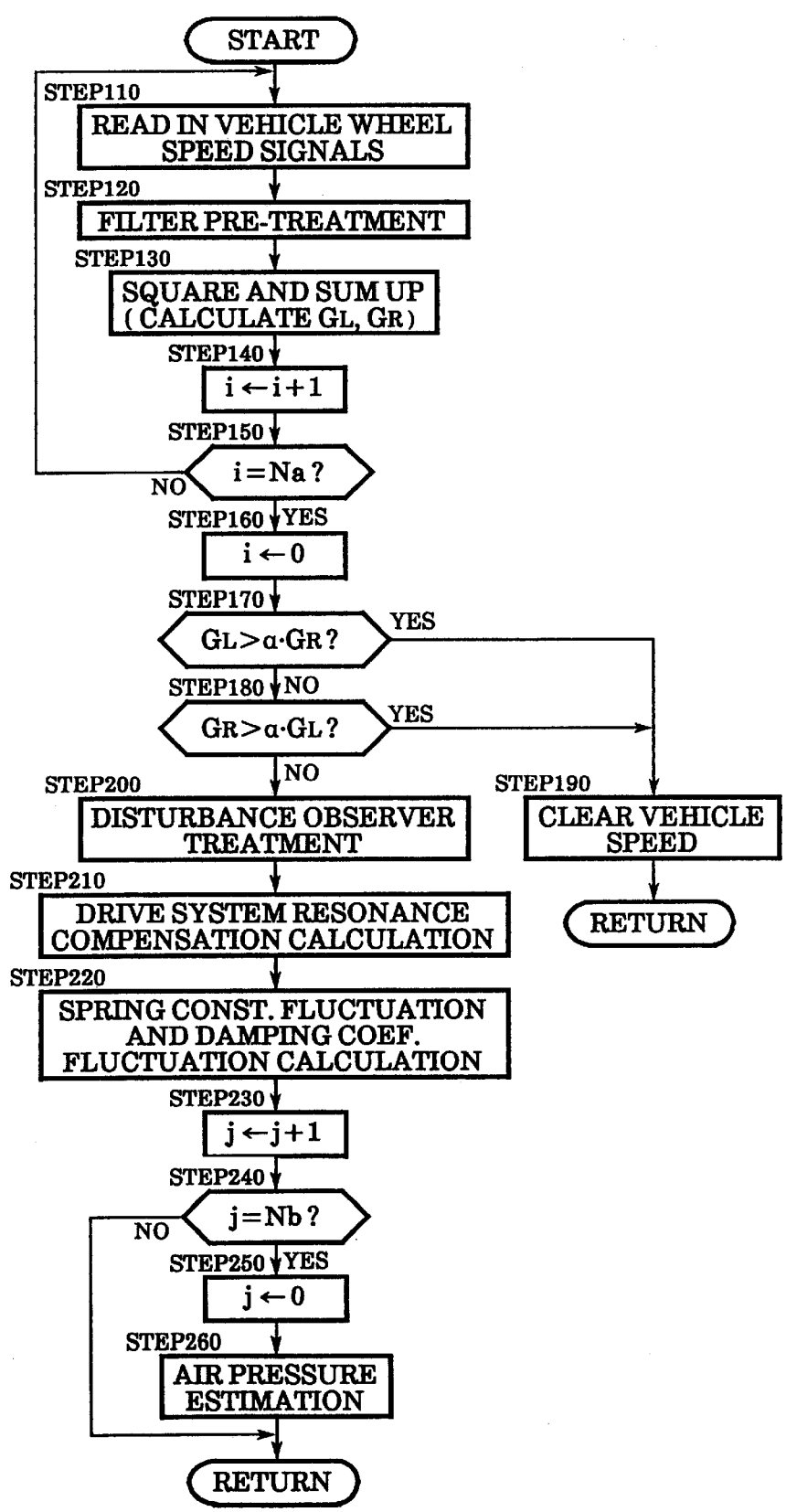
FIG. 20 is a flowchart showing the tire air pressure estimation routine of a fifth embodiment.

FIG. 20 is a flowchart showing a tire air pressure estimation routine of a fifth embodiment of the tire air pressure estimation device according to the present invention.

In this embodiment, in step 110 signals showing vehicle wheel speeds $V_R$ and $V_L$ of left and right driven vehicle wheels are read in, then in step 120 the signals are processed by pre-treatment filters 32L and 32R in the first embodiment in the same manner, and then in step 130 the filter pre-treated signals are processed such that vehicle wheel speeds $V_{FL}$ and $V_{FR}$ of the left and right driven vehicle wheels are each squared and summed up according to the following formulas 20 and 21 to provide square and sum up values GL and GR expressing the magnitude of each of the disturbances input from the road surface to the left and right driven vehicle wheels.

$$GL = \Sigma V_{FL}i \cdot V_{LF}i \qquad (20)$$

$$GR = \Sigma V_{FR}i \cdot V_{FR}i \qquad (21)$$

In step 140, i is incremented by 1, and in step 150 it is tested if i is equal to a standard value Na (a positive constant integer of the order of 100–1000). If the answer of the testing is no, the process returns to step 110, whereas if the answer is yes, the process proceeds to step 160, where i is reset to zero.

In step 170, it is tested if the square and sum up value GL is greater than α.·GR (α is a constant factor such as, for example, between 2 and 7), and if the answer is yes, the process proceeds to step 190, whereas, if the answer is no, the process proceeds to step 180, where it is tested if the square and sum up value GR is greater than α.·GL. If the answer is no, the step proceeds to step 200, whereas if the answer is yes, the process proceeds to step 190, where Na number of the filter pre-treated vehicle wheel speeds are cleared off, and then the process returns to step 110.

In step 200, estimated disturbances $w_L$ and $w_R$ of left and right driven vehicle wheels including the drive system resonance components are calculated according to the formulas 5 and 6 in the same manner as the treatment in the disturbance observers 34L and 34R of the first embodiment, and skew angles $\theta_{12L}$ and $\theta_{12R}$ and skew angular velocities $\dot{\theta}_{12L}$ and $\dot{\theta}_{12R}$ of the tires of the left and right driven vehicle wheels are calculated. In step 210, the signals are processed according to the formula 7 based upon the estimated disturbances of the left and right driven vehicle wheels in the same manner as in the drive system resonance compensation calculation block 36 of the first embodiment, to provide the estimated disturbance w cleared off of the influence of the drive system resonance.

In step 220, the spring constant fluctuations $\Delta K_L$ and $\Delta K_R$ and the damping coefficient fluctuations $\Delta C_L$ and $\Delta C_R$ of the tires are calculated based upon the estimated disturbance w, the skew angles $\theta_{12L}$ and $\theta_{12R}$ and the skew angular velocities $\dot{\theta}_{12L}$ and $\dot{\theta}_{12R}$ of the tires according to the least square method of formula 9, in the same manner as the processing conducted in the spring constant fluctuation and damping coefficient fluctuation calculation block 38 of the first embodiment.

In step 230, j is incremented by 1, and in step 240, it is tested if j is equal to a standard value Nb (a positive constant integer of the order of 10–100). If the answer of the testing is no, the process returns to step 110, whereas if the answer is yes, the process proceeds to step 250, and j is reset to zero. Thereafter, in step 260 the tire air pressures $P_L$ and $P_R$ of the left and right driven vehicle wheels are calculated based upon Na.Nb number of spring constant fluctuation and damping coefficient fluctuation data of the respective tires.

Sixth embodiment

Figure 21:
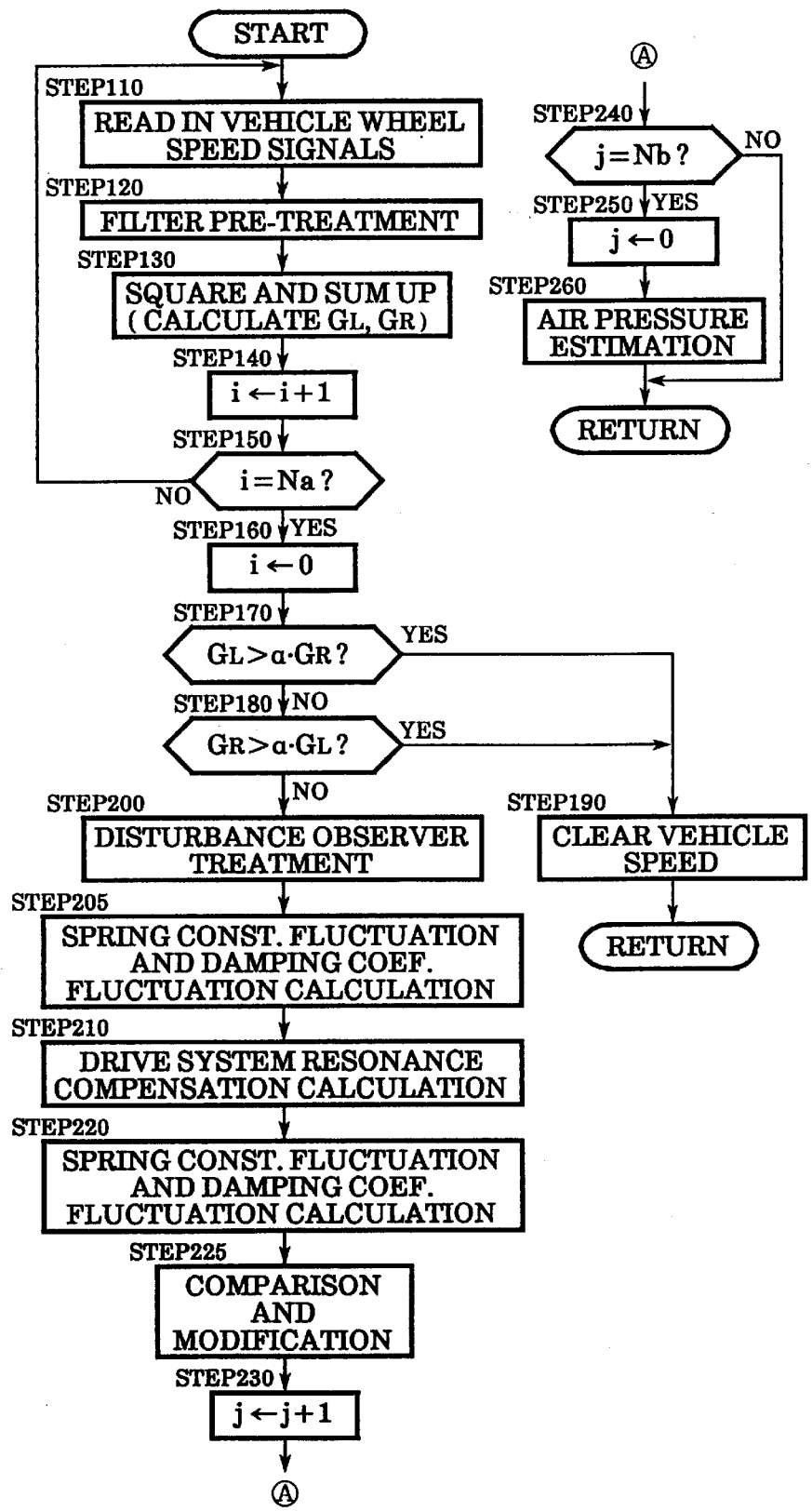
FIG. 21 is a flowchart showing the tire air pressure estimation routine of a sixth embodiment.

FIG. 21 is a flowchart showing a tire air pressure estimation routine conducted by a sixth embodiment of the tire air estimation device according to the present invention. In FIG. 21, the portions corresponding to those shown in FIG. 20 are designated by the same reference numerals.

The flow of control processes according to this embodiment is the same as that of the fifth embodiment, except steps 205 and 225, wherein, in step 205, in the same manner as in the spring constant fluctuation and damping coefficient fluctuation calculation blocks 44L and 44R of the second embodiment, spring constant fluctuations and damping coefficient fluctuations are calculated based upon the signals showing estimated disturbances $w_L$ and $w_R$ including the resonance components of the suspension member, etc., the skew angles $\theta_{12L}$ and $\theta_{12R}$ and the skew angular velocities $\dot{\theta}_{12L}$ and $\dot{\theta}_{12R}$ of the tires calculated in step 200.

In step 225, in the same manner as in the comparison and modification block 46 of the second embodiment, the tire air pressure estimation values $\delta_{L1}$ and $\delta_{R1}$ before the drive system resonance compensation are calculated based upon the spring constant fluctuations and damping coefficient fluctuations calculated in step 205, and compared, and then the estimated value of the high pressure side is modified by the difference m of the estimated values of the low pressure side before and after the drive system resonance compensation.

Thus, according to the fifth and sixth embodiments, in step 130, the square and sum up values GL and GR expressing the magnitude of the disturbance input to the left and right driven vehicle wheels from the road surface are calculated, and when the result of the judgment in step 170 or 180 is yes, in other words, when the difference of the magnitude of the disturbance input to the left and right driven vehicle wheels from the road surface during a time corresponding to Na cycles of the flowchart of FIG. 20 or 21 is large, steps 200–260 are not executed, and in step 190 the Na number of vehicle wheel speed data after the pretreatment by the filters are cleared off, so that it is definitely avoided that, under such a condition that the magnitude of the disturbance input to the left and right driven vehicle wheels from the road surface is changing to a large extent, the tire air pressure is incorrectly estimated to a lower value due to such fluctuations of the disturbance.

Further, according to these embodiments, the number of the vehicle wheel speed data cleared off in step 190 under the condition that the difference of the magnitude of the disturbance input to the left and right driven vehicle wheels from the road surface within a predetermined period is too large is Na, but the vehicle wheel speed data detected during a condition that the difference of the magnitude of the disturbance input to the left and right driven vehicle wheels is small are effectively used for the estimation of the tire air pressure. Therefore, the estimation of the tire air pressure is made at a higher efficiency than a case that all of Na·Nb data of vehicle wheel speed are cleared off. In the fifth and sixth embodiments, when the difference of the magnitude of the disturbance input to the left and right driven vehicle wheels during a predetermined period is large, in step 190 the data of vehicle wheel speed are cleared off so that the estimation of the tire air pressure is not carried out. However, it may be so constructed that, when the answer of step 170 or 180 is yes, steps 200 and 205 are carried out, and thereafter the control process proceeds to step 230 so that, when the difference of the magnitude of the disturbance input to the left and right driven vehicle wheels is large, the tire air pressure is estimated without conducting the drive system resonance compensation calculation.

Further, although in the fifth and sixth embodiment, the magnitude of the disturbance input to the left and right driven vehicle wheels during a predetermined period are squared and summed up according to formula 20 in step 130, it may be so constructed that the magnitude of the disturbance is processed such that the disturbances $w_L$ and $w_R$ processed in step 200 by the disturbance observers are squared and summed up, or such that they are calculated according to the following formula 22 or 23, wherein "sign" is the sign of the variable which follows thereto:

$$GL = \Sigma V_{LFi} \cdot \text{sign } V_{LFi} \quad (22)$$
$$GR = \Sigma V_{RFi} \cdot \text{sign } V_{RFi}$$
$$GL = \Sigma w_{Li} \cdot \text{sign } w_{Li} \quad (23)$$
$$GR = \Sigma w_{Ri} \cdot \text{sign } w_{Ri}$$

Although the present invention has been described in the above in detail with respect to some particular embodiments thereof, it will be apparent for those skilled in the art that the present invention is not limited to the shown embodiments but other various embodiments are possible within the scope of the present invention.

We claim:

1. A device for estimating air pressure of a tire of a driven vehicle wheel of a vehicle having a drive system which operates to drive said driven vehicle wheel, said driven vehicle wheel being one of a pair of left and right vehicle wheels, comprising: means for detecting vehicle wheel speed of said driven vehicle wheel to provide a vehicle wheel speed signal; means for extracting vibration components from said vehicle wheel speed signal; means for canceling from said extracted vibration components those vibration components which are originated in the operation of said drive system and which are in the same phase between the left vehicle wheel and the right vehicle wheel, resulting in a modified vibration signal; and means for estimating an air pressure of said tire of a driven vehicle wheel based upon a spring constant of said tire which is calculated from said modified vibration signal.

2. A device for estimating air pressure of a tire according to claim 1, wherein said left and right vehicle wheels are driven in common by said drive system, said device having said vehicle wheel speed detection means as provided for each of the left and right vehicle wheels, said vibration components extraction means extracting vibration components from each of the vehicle wheel speed signals of the left and right driven vehicle wheels, said vibration components cancellation means canceling the vibration components originated in a torque caused by the operation of said drive system from each of the extracted vibration components pertaining to the left and right driven vehicle wheels by canceling therefrom those vibration components which are same in the phase between the vehicle wheel speed signals of the left and right vehicle wheels.

3. A device for estimating air pressure of a tire according to claim 2, further comprising means for modifying said estimated tire air pressure which comprises:

first estimation means for estimating a first tire air pressure of each of the left and right vehicle wheel based upon said vibration components, means for comparing said first tire air pressures of the left and right driven vehicle wheels with one another to determine which of the two is lower in pressure, second estimation means for estimating a tire air pressure of one of the left and right driven vehicle wheels with the lower first tire air pressure based upon said modified vibration signal obtained therefor, means for calculating a difference between said first tire air pressure and said second tire air pressure of the wheel with the lower first tire air pressure; and means for modifying said tire air pressure of one of the left and right driven vehicle wheels with the higher first tire air pressure by subtracting said difference from said first tire air pressure of the wheel with the higher first tire air pressure.

4. A device for estimating air pressure of a tire according to claim 1, further comprising means for detecting fluctuation of the magnitude of disturbance input to the driven vehicle wheel from a road surface within a predetermined period, and means for stopping the estimation of tire air pressure when the magnitude of fluctuation exceeds a threshold condition.

5. A device for estimating air pressure of a tire according to claim 4, wherein said disturbance magnitude fluctuation detection means comprises means for filtering each of the vehicle wheel speed signals of the left and right vehicle wheels to generate a signal representing fluctuation of vehicle wheel speed of the left vehicle wheel and a signal representing fluctuation of vehicle wheel speed of the right vehicle wheel; means for generating a signal representing a square sum of said left vehicle wheel speed fluctuation during the predetermined period and a signal representing a square sum of said right vehicle wheel speed fluctuation during the predetermined period; and means for testing if either of the left and right vehicle wheel speed fluctuation square sum signals is greater than a predetermined number of times of the other of the left and right vehicle wheel speed fluctuation square sum signals to determine the stopping of the estimation of tire air pressure.

6. A device for estimating air pressure of a tire according to claim 5 further comprising means for estimating a further tire air pressure based upon a signal of said vibration components, and means for using the value of said further estimated tire air pressures thereof as the tire air pressure of each of the left and right driven vehicle wheels when the fluctuation exceeds a threshold condition.

7. A device for estimating air pressure of a tire according to claim 1, further comprising means for detecting fluctuation of the magnitude of disturbance input to the driven vehicle wheel from a road surface within a predetermined period, said disturbance magnitude fluctuation detection means comprising means for filtering each of the vehicle wheel speed signals of the left and right vehicle wheels to generate a signal representing fluctuation of vehicle wheel speed of the left vehicle wheel and a signal representing fluctuation of vehicle wheel speed of the right vehicle wheel; means for generating a signal representing a square sum of said left vehicle wheel speed fluctuation during the predetermined period and a signal representing a square sum of said right vehicle wheel speed fluctuation during the predetermined period; and means for testing if either of the left and right vehicle wheel speed fluctuation square sum signals is greater than a predetermined number of times of the other of the left and right vehicle wheel speed fluctuation square sum signals to stopping of the estimation of tire air pressure when the testing is answered yes.

8. A device for estimating air pressure of a tire of a non-driven vehicle wheel, comprising: means for detecting vehicle wheel speed of a non-driven vehicle wheel to provide a non-driven vehicle wheel speed signal; means for extracting vibration components of vehicle wheel speed due to vibration of a tire thereof from said non-driven vehicle wheel speed signal; means for estimating air pressure of the tire of the non-driven vehicle wheel based upon said vibration components; means for detecting loaded radius of each of the non-driven vehicle wheel and a driven vehicle wheel; and means for estimating air pressure of a tire of the driven vehicle wheel based upon the tire air pressure of the non-driven vehicle wheel and the loaded radii detected by said loaded radius detection means.

9. A device for estimating air pressure of a tire according to claim 8, comprising: means for generating signals of vehicle wheel speed of non-driven front left and front right vehicle wheels; means for generating signals of vehicle wheel speed of driven rear left and rear right vehicle wheels, means for calculating tire air pressures of the front left and front right vehicle wheels according to any one of a disturbance observer type and FFT type tire air pressure estimation method; means for calculating mean vehicle wheel speed of each of the front left, front right, rear left and rear right vehicle wheels; and means for calculating tire air pressures of the rear left and rear right vehicle wheels based upon the estimated front left and front right tire air pressures and ratios between the mean front left and rear left vehicle wheel speeds and between the mean front right and rear right vehicle wheel speeds.

10. A device for estimating air pressure of a tire according to claim 8, comprising: means for estimating tire air pressure of a non-driven front left or right vehicle wheel according to any one of a disturbance observer type and FFT type tire air pressure estimation method; and means for calculating tire air pressure of the other of four vehicle wheels according to ratio of loaded radius of each of the three other vehicle wheels against said front left or right vehicle wheel.

* * * * *